United States Patent
Sandsten et al.

(10) Patent No.: US 10,612,975 B2
(45) Date of Patent: Apr. 7, 2020

(54) GAS VISUALIZING METHODS AND SYSTEMS WITH BIREFRINGENT POLARIZATION INTERFEROMETER

(71) Applicant: FLIR Systems AB, Täby (SE)

(72) Inventors: Jonas Sandsten, Lomma (SE); Joakim Sjunnebo, Cambridge (GB)

(73) Assignee: FLIR SYSTEMS AB, Täby (SE)

( * ) Notice: Subject to any disclaimer, the term of this patent is extended or adjusted under 35 U.S.C. 154(b) by 0 days.

(21) Appl. No.: 15/833,861

(22) Filed: Dec. 6, 2017

(65) Prior Publication Data

US 2018/0106674 A1   Apr. 19, 2018

Related U.S. Application Data

(63) Continuation of application No. PCT/US2016/037933, filed on Jun. 16, 2016.
(Continued)

(51) Int. Cl.
*G01J 3/28* (2006.01)
*G01J 3/02* (2006.01)
(Continued)

(52) U.S. Cl.
CPC ........ *G01J 3/2823* (2013.01); *G01B 9/02001* (2013.01); *G01B 9/02041* (2013.01);
(Continued)

(58) Field of Classification Search
CPC ...... G01J 3/2823; G01J 9/0215; G01J 3/4531; G01J 3/0208; G01J 2003/2826; G01B 9/02089; G01B 9/02041; G01B 9/02001
(Continued)

(56) References Cited

U.S. PATENT DOCUMENTS

2012/0268745 A1  10/2012  Kudenov
2014/0078298 A1*  3/2014  Kudenov .............. G01J 3/2803
                                                              348/135

OTHER PUBLICATIONS

Craven-Jones et al. "Infrared Hyperspectral Imaging Polarimeter Using Birefringent Prisms", Applied Optics, Mar. 10, 2011, vol. 50, No. 8, pp. 1170-1185.
(Continued)

*Primary Examiner* — David P Porta
*Assistant Examiner* — Gisselle M Gutierrez
(74) *Attorney, Agent, or Firm* — Haynes and Boone, LLP

(57) ABSTRACT

Systems and methods disclosed herein provide for gas imaging. A gas imaging system comprises a lenslet array configured to receive thermal radiation from a scene and transmit a plurality of substantially identical sub-images of the thermal radiation; a birefringent polarization interferometer configured to generate an optical path difference for each ray of the plurality of sub-images based on a respective position of each ray entering the BPI, the optical path differences combining to form an interference fringe pattern; and an infrared focal plane array configured to capture a thermal image of the plurality of sub-images modulated by the interference fringe pattern due to the optical path differences through the BPI. The captured thermal image may represent a plurality of interferogram sample points of the thermal radiation from the scene, and may be used to construct a plurality of hyperspectral images of the thermal radiation from the scene.

20 Claims, 11 Drawing Sheets

Related U.S. Application Data

(60) Provisional application No. 62/180,557, filed on Jun. 16, 2015.

(51) Int. Cl.
    *G01J 9/02*         (2006.01)
    *G01J 3/453*       (2006.01)
    *G01B 9/02*        (2006.01)

(52) U.S. Cl.
CPC ........ *G01B 9/02089* (2013.01); *G01J 3/0208* (2013.01); *G01J 3/4531* (2013.01); *G01J 9/0215* (2013.01); *G01J 2003/2826* (2013.01)

(58) Field of Classification Search
USPC ........................................................ 250/332
See application file for complete search history.

(56) References Cited

OTHER PUBLICATIONS

FLIR Systems et al. "Thermal Imaging for Natural Gas Detection", 6 pages, [online], [retrieved on Sep. 21, 2016]. Retrieved from the Internet: <URL: http://web.archive.org/web/20150327121450/http://www.flir.com/ogi/display/?id=49562>.

Kudenov et al. "Compact Snapshot Birefringent Imaging Fourier Transform Spectrometer for Remote Sensing and Endoscopy", Optical Sensing II, Nov. 19, 2012, vol. 8542, pp. 854224-1-854224-11.

\* cited by examiner

GAS VISUALIZING METHODS AND SYSTEMS WITH BIREFRINGENT POLARIZATION INTERFEROMETER

CROSS-REFERENCE TO RELATED APPLICATIONS

This application is a continuation of International Patent Application No. PCT/US2016/037933 filed Jun. 16, 2016 and entitled "GAS VISUALIZING METHODS AND SYSTEMS WITH BIREFRINGENT POLARIZATION INTERFEROMETER," which is incorporated herein by reference in its entirety.

International Patent Application No. PCT/US2016/037933 filed Jun. 16, 2016 claims priority to and the benefit of U.S. Provisional Patent Application No. 62/180,557 filed on Jun. 16, 2015 and entitled "MULTIPLE GAS VISUALIZING METHODS AND SYSTEMS," which is incorporated herein by reference in its entirety.

TECHNICAL FIELD

The present disclosure relates generally to imaging and visualizing gas and, in particular, to imaging and visualizing gas using infrared imaging cameras and methods.

BACKGROUND

Thermal imaging devices, such as IR cameras, might be used for detecting gas occurrence, for example in the form of a gas cloud or gas plume e.g. from fugitive gas emissions or gas leaks, and for producing a visual representation of such gas occurrence as a gas infrared image. Such a gas infrared image can be used for visualizing gas occurrence or gas leaks, e.g. as smoke or a cloud on images presented on the viewfinder of a camera, on an integrated or separate display, or on an external computing device, thereby allowing the user to see gas occurrence in a scene observed and imaged by means of an IR camera. A variant of such techniques is called passive infrared gas imaging and is based on using radiation from a scene without any additional illumination for detecting gas.

Gas detection IR cameras, which are able to produce a full picture of a depicted area with gas appearing as smoke on the camera's viewfinder, have been provided. Two main types of cameras have been developed which operate in different wavelength bands; the mid-wave infrared band, 3-5 μm, and the long-wave infrared band, 7-14 μm. These cameras, which utilize a narrow-band spectral filter to single out the wavelength of interest, are able to detect and to visualize gases.

There is a need to improve the performance of IR cameras when in use for gas detection in gas imaging.

SUMMARY

Embodiments of the present disclosure comprise a gas imaging system. The system comprises a lenslet array configured to form a plurality of thermal radiation ray bundles based on received thermal radiation emitted from a scene. Further, the system comprises a birefringent polarization interferometer configured to generate an optical path difference for each respective ray of the plurality of ray bundles, where the optical path differences combine to form an interference fringe pattern, and an infrared detector configured to capture an array of thermal sub-images of the scene based on the respective thermal radiation ray bundles and modulated by the interference fringe pattern. The captured thermal sub-images may represent a plurality of interferogram sample points of the thermal radiation from the scene, and may be used to construct a plurality of hyperspectral images of the thermal radiation from the scene to enable detection, identification, and/or imaging of a selection of different gases in the scene.

In some embodiments, the birefringent polarization interferometer is positioned in the respective optical paths of the plurality of thermal radiation ray bundles, and the lenslet array and the birefringent polarization interferometer are configured such that the focal planes of lenslets comprised in the lenslet array coincide with an interference fringe localization plane.

In further embodiments, the infrared detector may optionally be positioned in the coinciding focal planes and the interference fringe localization plane. In some embodiments, a relay lens system may optionally be placed between the birefringent polarization interferometer and the infrared detector. In some embodiments, the thermal radiation ray bundles may form a plurality of thermal sub-images produced by the lenslet array.

In some embodiments, the lenslet array may comprise an array of lenslets each forming a substantially identical sub-image of infrared radiation received at the lenslet array (e.g., infrared radiation received from a scene containing gas). The number of lenslets in the lenslet array may be chosen to achieve desired spectral and spatial resolutions in response to the number of pixels (e.g., the spatial resolution) provided by the infrared detector and the gas absorption/emission spectra of interest. In some embodiments, the lenslet array may be configured as a two-dimensional array, while in other embodiments, the lenslet array may be configured as a one-dimensional array.

In some embodiments, the birefringent polarization interferometer may comprise a generating polarizer, two prisms, a half-wave plate and an analyzer. In some embodiments, the two prisms may be Nomarski prisms. For example, according to some embodiments, the two Nomarski prisms may be rotated 180 degrees in relation to each other, and/or the Nomarski prisms may comprise two uniaxial birefringent crystals wedged together with a wedge angle. In some embodiments, the two prisms may be made of rutile, $TiO_2$, or of sapphire, $Al_2O_3$.

In some embodiments, the gas imaging system may further comprise a processor, configured to identify different spectral bands in the array of thermal sub-images, and to image a selection of different gases in the scene based on the identified different spectral bands.

In other embodiments herein, a method in a thermal imaging apparatus for imaging a selection of different gases in a scene is provided. For example, according to one or more embodiments, the method comprises receiving thermal radiation emitted from a scene; forming, by a lenslet array, a plurality of thermal radiation ray bundles based on the received thermal radiation; generating, by a birefringent polarization interferometer, an optical path difference for each respective ray of said plurality of ray bundles, where the optical path differences combine to form an interference fringe pattern; capturing, by an infrared IR detector, an array of thermal sub-images of the scene based on the respective thermal radiation ray bundles and modulated by the interference fringe pattern. The captured thermal sub-images may represent a plurality of interferogram sample points of the thermal radiation from the scene, and may be used to construct a plurality of hyperspectral images of the thermal radiation from the scene to enable detection, identification, and/or imaging of a selection of different gases in the scene.

Some embodiments of the method may further comprise, by a processor and code portions, identifying different spectral bands in the array of thermal sub-images, and imaging a selection of different gases in the scene based on the identified different spectral bands.

The scope of protection is defined by the claims, which are incorporated into this section by reference. A more complete understanding of embodiments herein will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Some prior art gas imaging systems only resolve a single wavelength or a single narrow band of wavelengths, and are thus unable to identify the type of gas. There is a need to provide a further improved gas imaging system able to identify type of gas, that is, to determine which gas, or plurality of gases have been detected.

The embodiments of the disclosure relate to a gas imaging system and related method that enable imaging of a selection of different gases in the scene. The gas imaging system may be comprised in a thermal imaging apparatus, such as an IR camera, in accordance with one or more embodiments of the disclosure.

Cameras that have the capability to resolve a large number of wavelengths are called hyperspectral cameras. Such cameras measure spectrum of objects for each pixel in the image of a scene, and may be seen as a combination of a camera and a spectrometer. All atoms and molecules have a unique electromagnetic spectrum, a sort of spectral signature or fingerprint. Hence, the chemical composition of an object may be identified by measuring its spectrum. Hyperspectral imaging may be used in a large number of applications, for example, in agriculture and environmental surveys to remotely identify the progress and health of growing crops and forests, in mining and oil industries to look for minerals and oil, in biotechnology and biomedical engineering to study cells and proteins with fluorescent microscopy, and in astronomy to obtain spatially-resolved spectral images.

In accordance with embodiments of the disclosure, hyperspectral instruments are used for gas imaging, where gases may be detected and identified from their spectral signature. Such embodiments may target different gases with absorption and/or emission of electromagnetic radiation in different parts of the electromagnetic field.

A method to detect and/or identify gases from their electromagnetic absorption and/or emission spectrum using hyperspectral imaging is described herein. Spectral information is multiplexed by an interferometer based on birefringent polarizing prisms, and the interferogram is Fourier transformed to reconstruct the original spectrum. Embodiments of the disclosure are adapted and some instances optimized for optical gas imaging in the mid-wave infrared wavelength of 3-5 µm (micrometer). Some embodiments are adapted to detect and/or identify the hydrocarbon gases as well as carbon dioxide and nitrous oxide.

In accordance with embodiments of the disclosure, a complete hyperspectral image may be captured in a single exposure. One advantage of this is that the risk of scanning artifacts is eliminated. Some embodiments are used for detecting and/or identifying gases with varying spectra.

Figure 1:
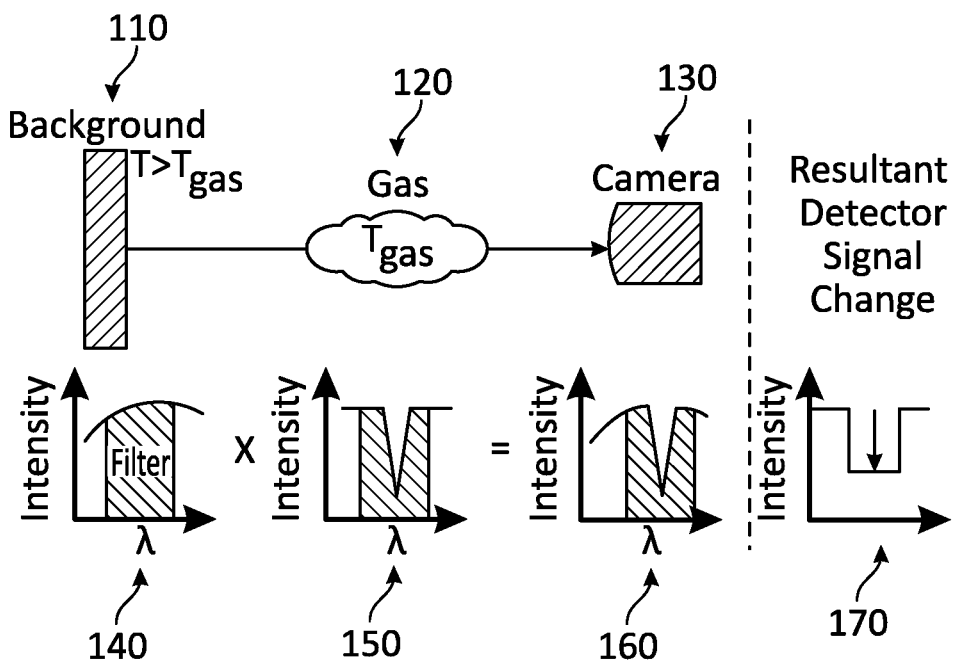
FIG. 1 shows a working principle of optical gas imaging, according to one or more embodiments presented herein.

FIG. 1 illustrates a working principle of optical gas imaging, according to one or more embodiments presented herein. It should be understood that the FIG. 1 is illustrated for absorption-based detection/imaging (e.g., when gas absorbs radiation) as an example, but that embodiments of the present disclosure are suitable for both absorption-based and emission-based gas detection/imaging. In the absorption-based example of FIG. 1, a background object 110 emits infrared radiation which passes through a gas cloud 120 that is cooler than the background, i.e. $T_{background} > T_{gas}$ and the gas absorbs some of the infrared radiation. In situations where gas cloud 120 is warmer than the background, i.e., $T_{background} < T_{gas}$ for emission-based detection/imaging, the gas emits more infrared radiation than is absorbed. A thermal radiation detector in a thermal imaging system 130, for example in the form of an IR camera, detects the resulting incident radiation. The absorption of radiation by the gas results in a lower detected signal at the detector in the thermal imaging system 130 than would be the case in the absence of a gas cloud, thus enabling imaging of gas based on the lower detected signal. Conversely, the emission of infrared radiation by gas results in a higher detected signal that would be the case in the absence of a gas cloud, thus enabling detection/imaging of gas based on the higher detected signal. For some embodiments, a filter is placed in front of the detector of the thermal imaging device to narrow the detected radiation to a selected wavelength band. The diagram 140 illustrates the intensity of radiation per wavelength with a filter for a selected wavelength.

As known in general physics, atoms absorb and emit radiation corresponding to electronic transitions between electron energy states. The energy of absorbed and emitted photons must equal the excitation and de-excitation energy of electrons to conserve energy. Because each transition has a specific energy difference, absorption and emission only occur for wavelengths corresponding to these specific energies. Perhaps the most well-known example of this is the absorption of solar radiation in the solar atmosphere, observed as dark lines, known as Fraunhofer lines, in the solar spectrum. Because the absorption and emission is unique to each element, the characteristic lines act as a kind of spectral signature or "spectroscopic fingerprint", a feature that can be used to identify elements. Most electronic transitions are in the ultraviolet or visible spectral range. However, many molecular gases have absorption and emission in the infrared spectral range. Molecules possess additional degrees of freedom compared to atoms, namely rotational and vibrational modes. As for the electronic transitions, rotational and vibrational excitations can only occur between specific energy states. Therefore, absorption and emission due to vibrational transitions only occur for specific wavelengths. Thus, any atom or molecule can be identified by measuring its characteristic spectrum.

Techniques, in accordance with embodiments, that detect gases by thermal imaging utilize absorption or emission of infrared radiation in rotational and vibrational bands of gas molecules. Thus, as illustrated in FIG. 1, a background object of temperature T emits radiation within a certain spectrum. The radiation passes through a gas plume of temperature $T_{gas}<T$. Some of the radiation, with wavelengths corresponding to the energy of vibrational excitations, is absorbed by the gas. The radiation that reaches the detector of the camera thus lacks certain wavelengths. This has the effect that the intensity at the detector is lower if there is some gas between the camera and the background object compared to the situation when there is no gas present at all.

By placing a filter in front of the detector according to some embodiments, as illustrated with diagram 140, the spectral region may be tuned to match an absorption band of a certain gas or a certain class of gases. A narrower filter, as illustrated with diagram 150, yields a larger relative signal change, and thus a higher signal contrast and sensitivity. However, the total intensity decreases, as illustrated with diagram 160, so there is a trade-off that is tuned by analyzing the signal-to-noise ratio, for example, tuned to reduce higher-order noise through spectral selection by the filter. The resultant detector signal change due to the filter(s) is illustrated with diagram 170. If the gas is hotter than the background, the contribution from gas emission will be larger than absorption. Therefore, a hot gas between the camera and the background results in an increase in the signal.

Apart from being absorbed and emitted, radiation can also be scattered, which happens when an excitation is immediately followed by de-excitation. In optical gas imaging applications, scattered radiation is often the result of hot objects other than the background, emitting radiation which is scattered by the gas and detected by the camera. Some embodiments comprise, for example, shielding to alleviate scattered radiation.

Some embodiments are further configured to detect and also quantify gas. Some embodiments in accordance with the disclosure are configured, in addition to detecting gas, to identify a detected gas by being configured to measure the intensity of a plurality of wavelengths. For example, such intensities may each constitute a sampled spectrum, to be compared with known gas spectra (e.g., including gas spectra generated by calculation and/or simulation, such as by the HITRAN simulation for gas emission/absorption and transmission spectra) and checked for a match.

Grayscale cameras produce images that describe the intensity I (x, y) as a function of two spatial coordinates, x and y. Color cameras reproduce the color of a scene by combining intensities from three separate color channels: red, green and blue. The channels correspond to three different bands in the visible spectrum. Hence, color cameras may be understood to produce images describing the intensity I (x, y, $\lambda$) as a function of the wavelength $\lambda$, in addition to the two spatial coordinates. According to some embodiments described herein, multispectral and hyperspectral cameras increase the number of spectral bands. Such a multispectral or hyperspectral system may have more than 10 spectral bands.

An object of hyperspectral imaging is to obtain a complete spectrum for each pixel of an image. Thus, a hyperspectral image may consist of a three-dimensional dataset typically called a datacube. The three sides of the cube represent x, y and $\lambda$, and each element represents the intensity I (x, y, $\lambda$). In hyperspectral imaging the datacubes may be of a higher dimensionality than two-dimensional detector arrays. This may be solved by either collecting time-sequential 2D slices of the cube, or simultaneously measuring all elements of a cube by dividing it into a plurality of 2D elements, distributed and organized in some way on the detector array, and then recombining them into a cube during post-processing. These two techniques are referred to as scanning and snapshot, respectively. Different scanning techniques are available. Spectral-scanning systems capture spatial images of a scene one spectral band at a time, for example by inserting a different filter in front of the detector for each image. Point-scanning systems capture a spectrum of each point of the scene, one point at a time. Such systems typically disperse light from a single point of the scene onto a line-array detector. Line-scanning systems image the scene one slice at a time, where light enters the system through a thin slit, and is dispersed onto the detector array.

Some embodiments may operate in the spectral range where the monitored gases have absorption peaks. Several different ranges may be of interest. For example, many hydrocarbons, such as 1-pentene, benzene, butane, ethane, ethanol, ethylbenzene, ethylene, heptane, hexane, isoprene, MEK, methane, methanol, MIBK, octane, pentane, propane, propylene, toluene, and xylene, have absorption in the lower mid-wavelength infrared, 3-5 micrometers, and the potent greenhouse gas sulfur hexafluoride, (SF6), and several refrigerant gases have absorption in the long-wavelength infrared, 7-14 micrometers. All components in the system may transmit, or reflect in the case of mirrors, radiation in the intended spectral range. Further, in systems with extremely small components, with sizes the same order or less than the wavelength of the infrared light, diffraction effects may occur.

Various embodiments of the disclosure may utilize spectral filters, prisms, diffraction gratings or interferometers, or any combination thereof, to extract spectral information. Techniques utilizing interferometers, like for example Fourier transform infrared spectroscopy, have some advantages compared to filtering and dispersive techniques. These advantages are called Fellgett's advantage and Jacquinot's advantage.

Fellgett's advantage, also called the multiplex advantage, may be described as an improved signal-to-noise ratio of interferometric measurements compared to direct measurements. This is due to the fact that with filters and dispersive elements, such as prisms and gratings, one wavelength is measured at a time. Thus, each pixel receives only a fraction of the total intensity of the light, since only a single wavelength reaches each pixel; all other wavelengths have been filtered out or dispersed to other pixels. Interferometers, on the other hand, multiplex the signal, thus, the spectral information from all wavelengths are measured simultaneously. Thus, the intensity of the signal is not reduced by filtering or dispersing the signal, which results in a higher signal-to-noise ratio for interferometer-based systems.

Jacquinot's advantage, or the throughput advantage, is an improved signal-to-noise ratio due to higher optical throughput of interferometers when compared to dispersive elements, which require small entrance slits that restrict the amount of light that passes through them.

A high signal-to-noise ratio is an advantage in optical gas imaging techniques, particularly for quantitative measurements. Different configurations may be provided according to different embodiments. For a comparison, multiple-image Fourier transform spectral imaging is a technique combining a two-dimensional lenslet array with a Michelson interferometer. However, this mirror interferometer-based technique is sensitive to vibrations, thermal expansion, air turbulence, and other effects that may affect the measurements.

According to various embodiments, a robust device, which is less sensitive to vibrations, is provided and comprises a snapshot hyperspectral imaging Fourier transform spectrometer. This is an alternative to the Michelson interferometer in other embodiments and comprises a birefringent polarization interferometer, with birefringent prisms. Exemplifying embodiments comprising such techniques are described herein. In this regard, embodiments of the disclosure advantageously provide an improved signal-to-noise ratio compared with filter-based or dispersive technologies.

A gas imaging system in accordance with embodiments of the disclosure in the form of a snapshot hyperspectral imaging Fourier transform spectrometer comprises a lenslet array, a birefringent polarization interferometer and a focal plane array in the form of a thermal radiation detector, also called an IR detector.

In various embodiments, the birefringent polarization interferometer (BPI) comprises birefringent materials having a refractive index that depends on both the polarization and the propagation direction of light. This may be of a type of birefringent media that has one symmetry axis and is called uniaxial. This axis, called the optic axis, governs the anisotropy and defines a special direction of the media. All directions at a given angle to the optic axis are optically equivalent. Such uniaxial media split an incident beam into two rays: one, called the ordinary ray (o-ray), with the polarization perpendicular to the optic axis, and the other, called the extraordinary ray (e-ray), with the polarization partly in the direction of (but not necessarily parallel to) the optic axis. Operations and principles of the BPI according to embodiments of the disclosure are described below with reference to Equations 1-15 relating to ray tracing of the o-ray and e-ray through uniaxial media.

The ordinary wave (o-wave) obeys Snell's law, $$n_1 \sin \theta_1 = n_0 \sin \theta_0, \quad \text{(Equation 1)}$$

where $n_1$ is the refractive index of the incident medium, $\theta_1$ is the incident angle, $n_0$ is the refractive index of the o-wave in the birefringent material, and $\theta_0$ is the o-wave angle of refraction. The extraordinary wave (e-wave) obeys a similar law, $$n_1 \sin \theta_1 = n \sin \theta_e, \quad \text{(Equation 2)}$$

where $\theta_e$ is the angle of refraction for the e-wave, and n is the effective refractive index for the e-wave. The difference between the two formulas is that $n_0$ is a constant, whereas n is a function of the angle between the e-wave vector and the optic axis. Denoting this angle by $\theta$, we have Equation 3:

$$n = \frac{n_0 n_e}{\sqrt{n_0^2 \sin^2\theta + n_e^2 \cos^2\theta}}, \quad \text{(Equation 3)}$$

where $n_e$ is the extraordinary refractive index. Note that n varies between the two extreme values $n_0$ and $n_e$ for different $\theta$. $n_0$ and $n_e$ are both properties of the birefringent medium, and are usually expressed as the birefringence $B = n_e - n_0$.

In isotropic media, the wave vector k and the ray vector (Poynting vector) S point in the same direction. However, in birefringent media, this is only true for the ordinary ray. For the extraordinary ray, the wave vector $k_e$ and the ray vector $S_e$ are not parallel, which means that the power flow, given by the Poynting vector, is not in the same direction as the surfaces of constant phase. Because the ordinary wave vector and ray vector are the same, Equation 1 fully describes the ordinary refraction.

The behavior of the extraordinary wave vector and the ray vector according to embodiments of the disclosure is calculated as follows. In an example of extraordinary ray and wave vector refraction in uniaxial media, a wave vector $\hat{k}_1$ is incident on the surface of a birefringent medium at an angle $\theta_1$. The extraordinary wave vector $\hat{k}_e$ is refracted with an angle $\theta_e$ and the extraordinary ray vector $\hat{S}_e$ is an angle $\alpha$ from $\hat{k}_e$. The optic axis is denoted by $\hat{w}$ and the coordinate system is chosen so that the x-axis is the surface normal $\hat{n}$. A monochromatic plane wave $\hat{k}_1$ falls on the plane surface of a birefringent medium. A coordinate system is chosen so that the x-axis is parallel to the surface normal $\hat{n}$, and the yz-plane is coincident with the surface. $\hat{k}_e$ is the refracted e-wave vector, $\hat{S}_e$ is the refracted e-ray vector, and $\hat{w}$ is the optic axis. The phase matching condition $$\hat{k}_1 \cdot r = \hat{k}_e \cdot r, \quad \text{(Equation 4)}$$

where r is any point on the surface, imply that the e-wave vector $\hat{k}_e$ is in the plane of incidence (the xy-plane). Hence, $\hat{k}_e = (\cos \theta_e, \sin \theta_e, 0)$, where $\theta_e$ is the angle of refraction for the e-wave. Let $\hat{w} = (x_0, y_0, z_0)$, then, because the angle between the optic axis and the e-wave vector is $\theta$, $$\hat{k}_e \cdot \hat{w} = \cos \theta = x_0 \cos \theta_e + y_0 \sin \theta_e. \quad \text{(Equation 5)}$$

Substituting this into Equation 3, we get Equation 6:

$$n = \frac{n_0 n_e}{\sqrt{n_0^2[1 - (x_0 \cos \theta_e + y_0 \sin \theta_e)^2] + n_e^2(x_0 \cos \theta_e + y_0 \sin \theta_e)^2}}. \quad \text{(Equation 6)}$$

Inserting this Equation 6 into Equation 2 and simplifying, we get a quadratic equation in $\cot \theta_e$, Equation 7:

$$[n_0^2 + x_0^2(n_e^2 - n_0^2)]\cot^2\theta_e + 2x_0y_0(n_e^2 - n_0^2)\cot\theta_e + \quad \text{(Equation 7)}$$

$$n_0^2 + y_0^2(n_e^2 - n_0^2) - \frac{n_0^2 n_e^2}{n_1^2 \sin^2\theta_1} = 0.$$

Solving this equation, we get Equation 8:

$$\cot\theta_e = \frac{-2x_0y_0(n_e^2 - n_0^2) \pm 2n_0 \sqrt{\frac{n_0^2 n_e^2 + n_e^2 x_0^2(n_e^2 - n_0^2)}{n_1^2 \sin^2\theta_1} - [n_0^2 - (n_e^2 - n_0^2)(x_0^2 + y_0^2)]}}{2[n_0^2 + x_0^2(n_e^2 - n_0^2)]}. \quad \text{(Equation 8)}$$

Only one of the solutions will be physically reasonable, corresponding to the solution that lies between the two extreme values of $\theta_e$ when $n_o$ and $n_e$ are substituted into Equation 2.

It can be shown that the angle between $\hat{k}_e$ and $\hat{S}_e$ is given by Equation 9:

$$\alpha = \frac{(n_e^2 - n_0^2)\tan\theta}{n_e^2 + n_0^2\tan^2\theta}. \quad \text{(Equation 9)}$$

$\alpha$ can also be related to $\hat{k}_e$ and $\hat{S}_e$ through their scalar product, $$\hat{S}_e \cdot \hat{k}_e = \cos\alpha. \quad \text{(Equation 10)}$$

In general, S^e is not in the incident plane. However, it is coplanar with $\hat{w}$ and $\hat{k}_e$, thus, $$\hat{S}_e \cdot \hat{w} \times \hat{k}_e = 0. \quad \text{(Equation 11)}$$

Combining Equations 5, 9, 10, and 11, together with the normalization condition on $\hat{S}_e = (S_x, S_y, S_z)$, yields:

$$S_x = \cos\alpha\cos\theta_e + \frac{\sin\theta_e\sin\alpha(x_0\sin\theta_e - y_0\cos\theta_e)}{\sqrt{z_0^2 + (x_0\sin\theta_e - y_0\cos\theta_e)^2}}, \quad \text{(Equation 12)}$$

$$S_y = \cos\alpha\sin\theta_e - \frac{\cos\theta_e\sin\alpha(x_0\sin\theta_e - y_0\cos\theta_e)}{\sqrt{z_0^2 + (x_0\sin\theta_e - y_0\cos\theta_e)^2}}, \quad \text{(Equation 13)}$$

$$S_z = \frac{z_0\sin\alpha}{\sqrt{z_0^2 + (x_0\sin\theta_e - y_0\cos\theta_e)^2}}. \quad \text{(Equation 14)}$$

With these equations, the propagation of both the ordinary and the extraordinary rays and waves may be calculated in any uniaxial medium, in accordance with embodiments.

The final result from this calculation is in some embodiments used when calculating optical path lengths, is the effective refractive index for the e-ray vector $n_S$, which is $$n_S = n\cos\alpha. \quad \text{(Equation 15)}$$

Figure 2:
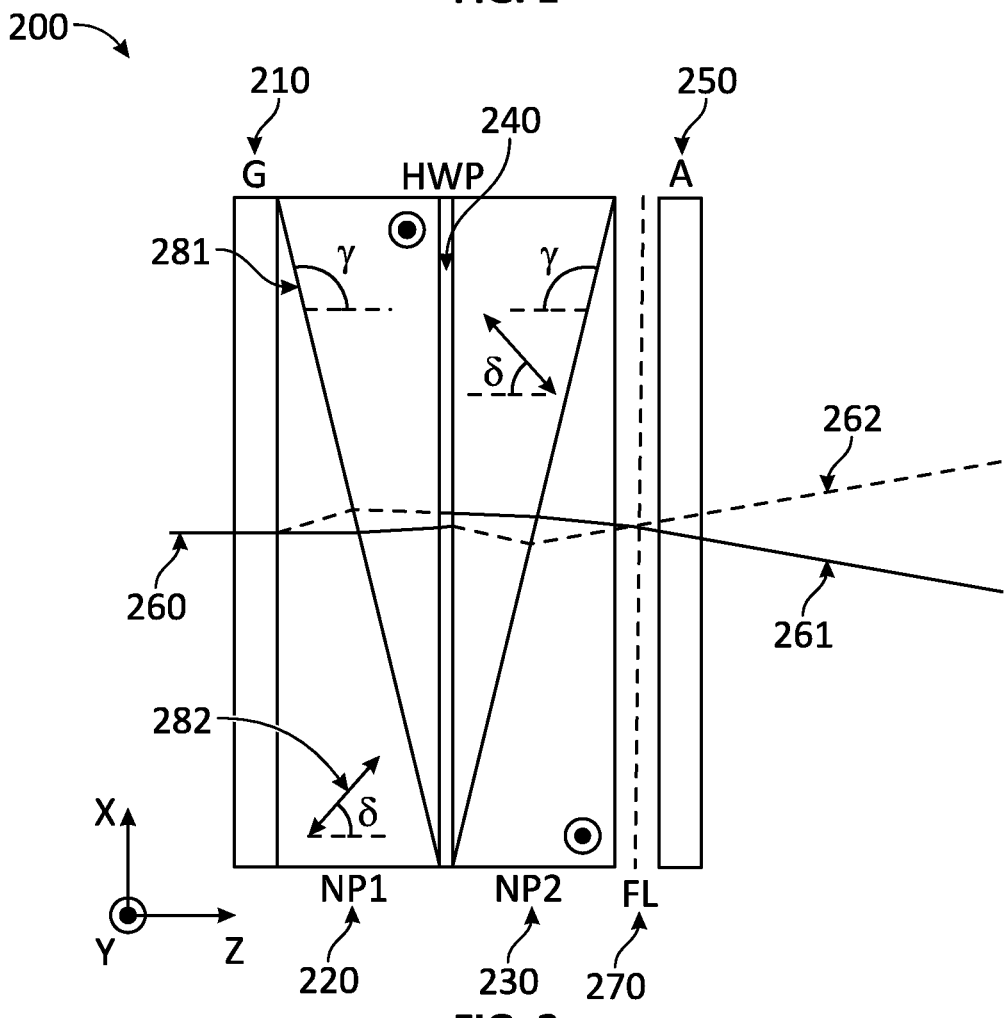
FIG. 2 shows a birefringent polarization interferometer (BPI) comprised in a gas imaging system, according to one or more embodiments presented herein.

FIG. 2 shows a birefringent polarization interferometer (BPI) 200 comprised in a gas imaging system according to one or more embodiments presented herein. In some embodiments, the BPI 200 comprises a generating polarizer 210 (also labeled "G" in the figures), a first prism 220, a second prism 230, optionally a half-wave plate 240 and optionally an analyzer 250 (a second polarizer, also labeled "A" in the figures). In some embodiments, the first prism 220 and second prism 230 are separated by the half-wave plate 240.

As shown in FIG. 2, a non-polarized light ray 260 (e.g., infrared ray) enters the BPI 200 (from the left in the example of FIG. 2). In FIG. 2, spatial orientation is indicated by a coordinate system x-y-z, with the x axis vertical and the z axis horizontal in the plane of the figure and y pointing out of the plane. In embodiments, the generating polarizer 210, which in this example is oriented at 45 degrees in the xy-plane, generates a polarized light beam with a polarization state which is a superposition of equal parts x and y polarization. In embodiments, the first prism 220 splits the linearly polarized beam into two orthogonally polarized beams, a first orthogonally polarized beam 261 (shown in FIG. 2 as a solid line) and a second orthogonally polarized beam 262 (shown in FIG. 2 as a dashed line), which may respectively correspond to the ordinary and the extraordinary rays of a uniaxial crystal discussed above with reference to Equations 1-15.

The half-wave plate 240 rotates the polarization states 90 degrees so that the polarization directions of the two orthogonally polarized rays 261, 262 are switched. The second prism 250, identical to the first prism but relatively rotated 180 degrees around the z-axis or x-axis, focuses the two orthogonally polarized rays so that they intersect in a fringe localization plane 270 parallel to the xy-plane, indicated in FIG. 2 by the vertical dashed line between the second prism 230 and the analyzer 250, also referred to as the interference fringe localization plane 270. In some embodiments, non-linear filtering or other optical filtering may be performed in the interference fringe localization plane 270, for example by providing an optical filter or other optical element.

Since the rays travel different paths through the prisms, there will be an optical path difference $\Delta$ between them. $\Delta$ depends on the x-position and angle of the incident ray, and determines the interference fringe pattern. In embodiments, the analyzer 250 analyzes the two orthogonally polarized rays 261, 262 into a coherent polarization state, enabling interference fringes to be formed on a detector once focused by converging lenses or relay lens system (e.g., a relay lens system 320 in FIG. 3A below).

In embodiments illustrated by FIG. 2, the prism may for example be a Nomarski prism (NP), consisting of two uniaxial birefringent crystals here wedged together with a wedge angle γ, which splits the linearly polarized beam into two orthogonally polarized beams, which may correspond to the ordinary and the extraordinary rays, respectively, of the uniaxial crystal as discussed above. The optic axis of the first wedge is oriented at an angle δ in the zx-plane. As described herein, the ordinary ray always has a polarization perpendicular to the optic axis, so its polarization is in the y-direction. The extraordinary ray, which always has a polarization component in the direction of the optic axis, is polarized in the x-direction. In the figure, the path of the two polarization states x and y is represented by the dashed line (the line representing polarized ray 262) and the solid line (the line representing polarized ray 261), respectively.

In the second crystal wedge, the optic axis is parallel to the y-axis. Thus, the ray that was ordinary in the first wedge becomes extraordinary in the second wedge, since the polarization of the ray is unchanged by the refraction and still is in the y-direction, i.e. parallel to the optic axis of the second wedge. Similarly, the extraordinary ray in the first wedge becomes ordinary in the second. After the first Nomarski prism, a half-wave plate (HWP), oriented at 45° in the xy-plane, rotates the polarization states 90π so that the polarization direction of the two orthogonally polarized rays are switched. Hence, the ray that was x polarized before the HWP becomes y polarized, and vice versa. A second Nomarski prism (NP2), identical to NP1 but rotated 180°, focuses the two rays so that they intersect in a plane parallel to the xy-plane.

Since the rays travel different paths through the prisms, there will be an optical path difference Δ between them. Δ depends on the distance from the point where the ray strikes the BPI to the BPI symmetry plane that is coplanar with the yz-plane (where the wedges have the same thickness). Hence, Δ depends on the x-position and, in general, the angle of the incident ray, and determines a resulting interference fringe pattern. The fringes are localized in the plane where the rays intersect, the fringe localization plane (FL). The analyzer 250 (A), identical to the generating polarizer 210 (G), analyzes the rays into a coherent polarization state, enabling interference fringes to be formed on a detector.

Figure 3A:
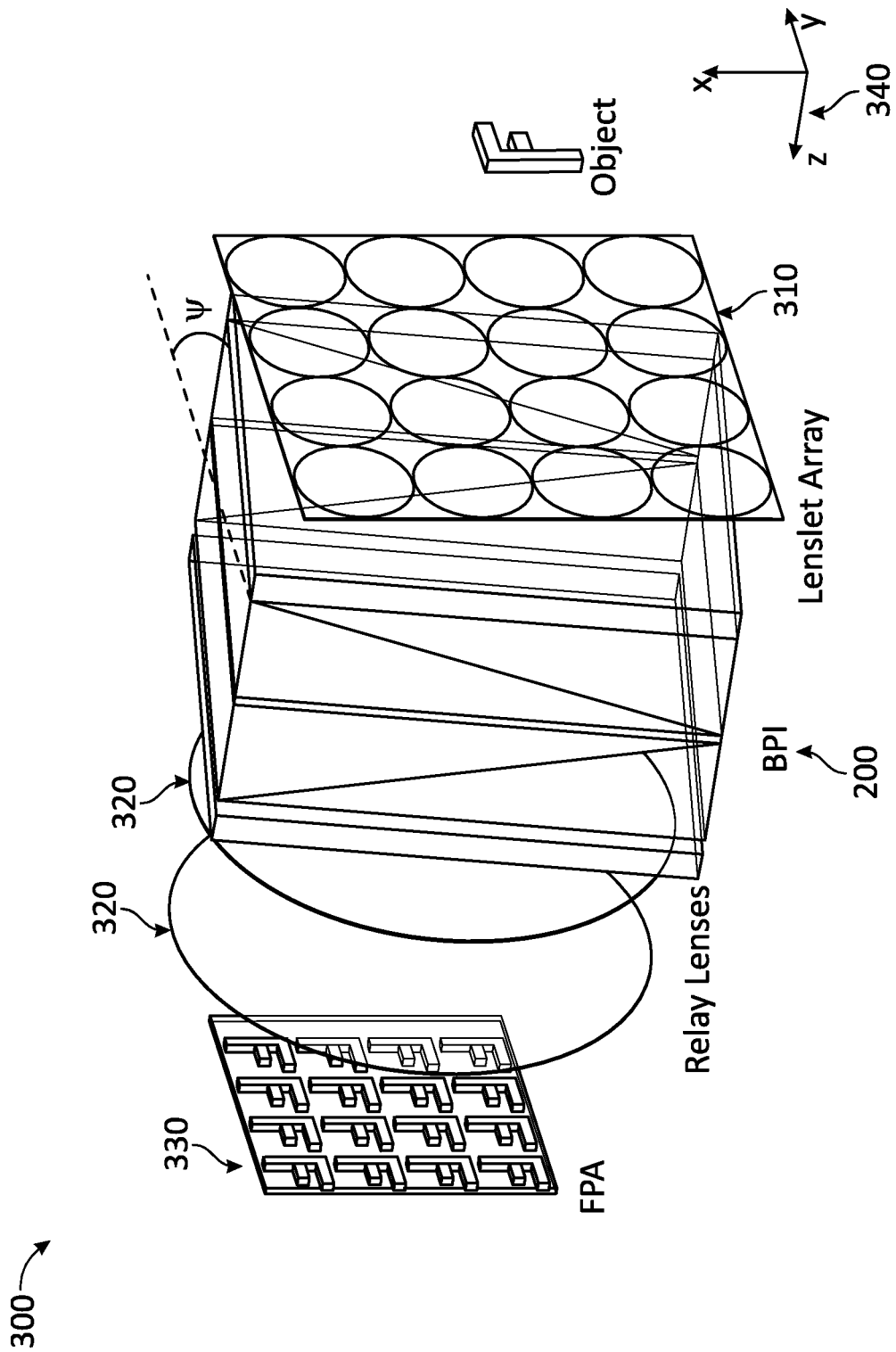
FIG. 3A shows schematically a gas imaging system, according to one or more embodiments presented herein.

FIG. 3A shows schematically an optical system 300 comprised in a gas imaging system (e.g., in the thermal imaging system 130), according to one or more embodiments of the disclosure. In embodiments, an object in an observed scene is imaged by an array of smaller lenses (also referred to as lenslets), from here on referred to as a lenslet array 310, which creates a plurality of light bundles forming an array of identical (or substantially identical due to negligible or tolerable parallax error between the lenses of the lenslet array 310, for example) sub-images of the object, in short also called sub-images. The sub-image light bundles are transmitted through the BPI 200 which creates the optical path difference as a function of x-position and angle of the incident ray as discussed above. The distance between the lenslet array 310 to the BPI 200 and the focal length of the lenslets 310 are chosen so that the focal planes of the lenslets 310 are coincident with the fringe localization plane 270 (not shown in FIG. 3A). This makes the sub-images coincident with the interference. The BPI 200 is rotated an angle ψ around the z-axis 340, which introduces a y-position dependence in Δ. This follows from the fact that the BPI symmetry plane is rotated, so the distance to this plane will depend on y for a given x Relaying the sub-images through a relay lens system 320 relocates and focuses both the fringes and the sub-images onto a focal plane array (FPA) 330 preferably in the form of a thermal radiation detector, also called IR detector. By placing the FPA 330 at this relocated position of the fringes and the sub-images, an array of focused sub-images together with an interference pattern is recorded on the detector. Relaying in this way may be beneficial to allow a greater degree of freedom in choosing the position of the fringe localization plane 270, and in turn a greater degree of freedom in designing and optimizing the elements of the BPI 200 such as the prisms 220 and 230. Furthermore, relaying through the relay lens system 320 may permit cooled FPA detectors to be utilized, by providing room for a container (e.g., a Dewar cooler assembly) enclosing and cooling the detector array. In other embodiments, as discussed above, the FPA 330, such as a sensitive, uncooled infrared FPA, may be placed directly at the fringe localization plane 270, instead of relaying the sub-images through the relay lens system 320. In such embodiments, the analyzer 250 may be repositioned closer to the second prism 230 to form the fringe localization plane 270 after the analyzer 250.

Thus, the optical system 300 according to one or more embodiments comprises: the lenslet array 310 configured to form a plurality of thermal radiation ray bundles based on received thermal radiation emitted from a scene, each ray bundle representing the received thermal radiation emitted from the scene (e.g., each bundle representing a sub-image of the same or substantially same thermal radiation emitted from the identical or substantially identical scene); the BPI 200 configured to generate an optical path difference (e.g., by splitting and recombining each ray into two rays, where the optical path difference between the two results in an interference appearing as a corresponding intensity level) for each ray of the plurality of ray bundles (e.g., for each ray of the plurality of sub-images formed by the lenslet array 310), where the aggregate of all rays through the BPI 200 creates an interference fringe pattern; and the FPA 330 (an infrared IR detector) configured to capture an array of thermal sub-images of the scene based on the respective thermal radiation ray bundles and modulated by the interference fringe pattern. The captured array of sub-images thus represents an interferogram of the thermal radiation from the scene, which can be reconstructed (e.g., by applying the Fourier transform as discussed herein below for some embodiments) into a hyperspectral image comprising thermal images of the scene in different spectral bands and enabling imaging a selection of different gases in the scene.

Embodiments illustrated in FIG. 3A form a birefringent polarization interferometer incorporated into the snapshot hyperspectral imaging system. The interference of two monochromatic beams of the same wavenumber $\tilde{v} \cong 1/\lambda$ is given by $$I = I_1 + 2\sqrt{I_1 I_2} \cos(\varphi_2 - \varphi_1), \quad \text{(Equation 16)}$$

where $I_1$ and $I_2$ are the intensities of the beams, $\varphi_1$ and $\varphi_2$ are the phase of the beams, and I is the total resultant intensity. The phase of a beam is $\varphi = 2\pi \tilde{v} L$, where L is the optical path length of the beam, i.e. the distance traveled multiplied by the refractive index. The difference in optical path lengths of two beams is $L_2 - L_1 = \Delta$, which is the optical path difference. Substituting this in Equation 16 and setting $I_1 = I_2 = \frac{1}{2} I_0$, where $I_0$ is some source intensity, yields $$I(\Delta) = I_0(1 + \cos(2\pi \tilde{v} \Delta)). \quad \text{(Equation 17)}$$

For a source emitting a spectrum of wavenumbers $I(\tilde{v})$, the intensity as a function of Δ can be expressed as Equation 18:

$$I(\Delta) = \int_0^\infty I(\tilde{v})(1 + \cos(2\pi \tilde{v} \Delta)) d\tilde{v}. \quad \text{(Equation 18)}$$

This can be rewritten as Equation 19:

$$I(\Delta) = \frac{1}{2} \int_{-\infty}^\infty I(\tilde{v})(1 + e^{i 2\pi \tilde{v} \Delta}) d\tilde{v}. \quad \text{(Equation 19)}$$

The spectrum of the source $I(\tilde{v})$ is recovered by Fourier transforming the interferogram $I(\Delta)$ as represented by Equation 20:

$$I(\tilde{v}) = \mathcal{F}[I(\Delta)] = \frac{1}{2} \int_{-\infty}^\infty I(\Delta)(1 + e^{-i 2\pi \tilde{v} \Delta}) d\Delta. \quad \text{(Equation 20)}$$

As described, the rotated BPI creates an optical path difference Δ that is a function of x, y, and, in general, the incident angle $\theta_1$. The influence of $\theta_1$ is small compared to x and y and can normally be ignored. As BPI is rotated at an angle $\psi \neq 0$, the optical path difference will be $\Delta = \Delta(x, y)$ and all pixels will sample a different optical path difference. Assuming that the number of lenslets in the lenslet array is N×M, there will be N×M sub-images generated on the FPA 330. The result is N×M focused sub-images on the FPA, modulated by an interference fringe pattern determined by the spectral properties of the scene.

Figure 3B:
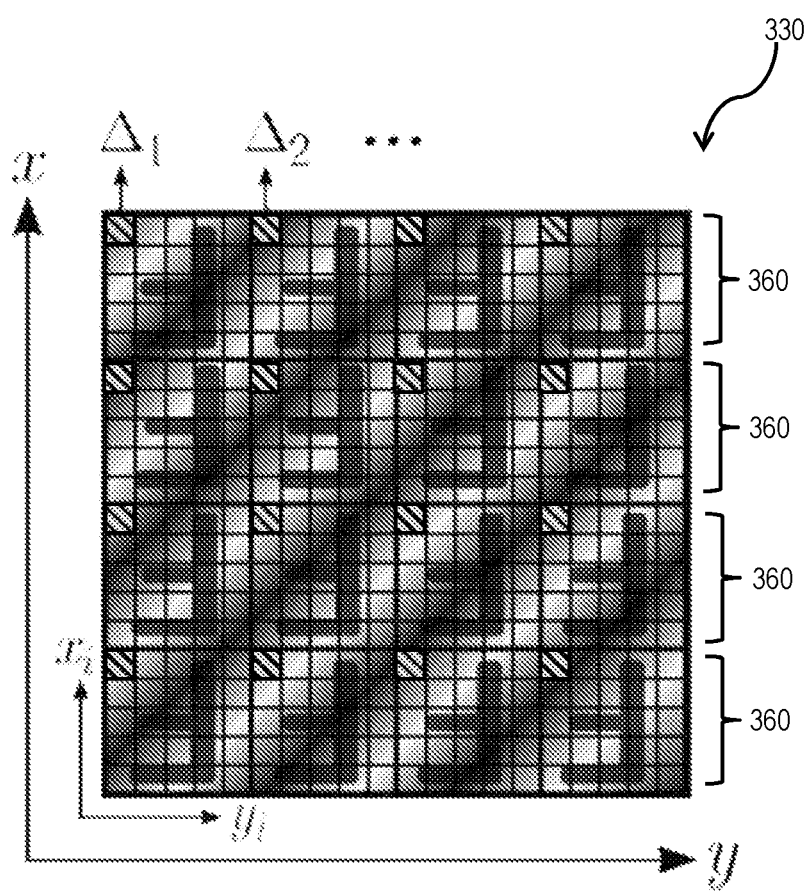
FIG. 3B shows a plurality of sub-images received at a focal plane array in the form of a thermal radiation detector, according to one or more embodiments presented herein.

FIG. 3B illustrates a plurality of sub-images 360 generated on a focal plane array in the form of a thermal radiation detector. In FIG. 3B a global coordinate system xy is the same as in FIG. 3A, whereas the $x_i y_i$ system is local to sub-image i, for $i \in \{1, 2, \ldots, N \times M\}$, and describes the relative position within a sub-image. Each pixel at the same relative position within the sub-images receives a different Δ and therefore detects a different intensity. The intensities of all these pixels make up the interferogram for the corresponding point on the object. In FIG. 3B, the fringe pattern is depicted by the light and dark stripes.

The intensities of all pixels at the same relative position within the sub-images form an interferogram of the corresponding point on the object. In FIG. 3B, for example, the intensities of the pixels marked yellow (shown also as hatched boxes) make up the interferogram for the lowest-rightmost pixel, since the image is reflected horizontally and vertically, point on the object. The spectrum of the point is reconstructed by taking a Fourier transform of the interferogram using Equation 20. The full hyperspectral images are constructed by repeating this procedure for all pixels in the sub-image.

Various embodiments of the disclosure provide different configurations and different configuration parameters of a hyperspectral gas imaging system. For example, in an example configuration according to some embodiments, the BPI 200 may comprise a half-wave plate. Referring again to FIG. 2, the configuration parameters may comprise at least one of:

geometric parameters, such as thickness, height and position, of polarizers 210, 250, prisms 220, 230 and half-wave plate 240;
optical parameters, such as refractive index, of polarizers 210, 250, prisms 220, 230, half-wave plate 240, and possibly surrounding medium;
optical parameters, such as ordinary and extraordinary refractive indices, of prisms 220, 230; and/or
optical parameters, such as wedge angle γ 281 and optic axis inclination angle δ 282.

Figure 4:
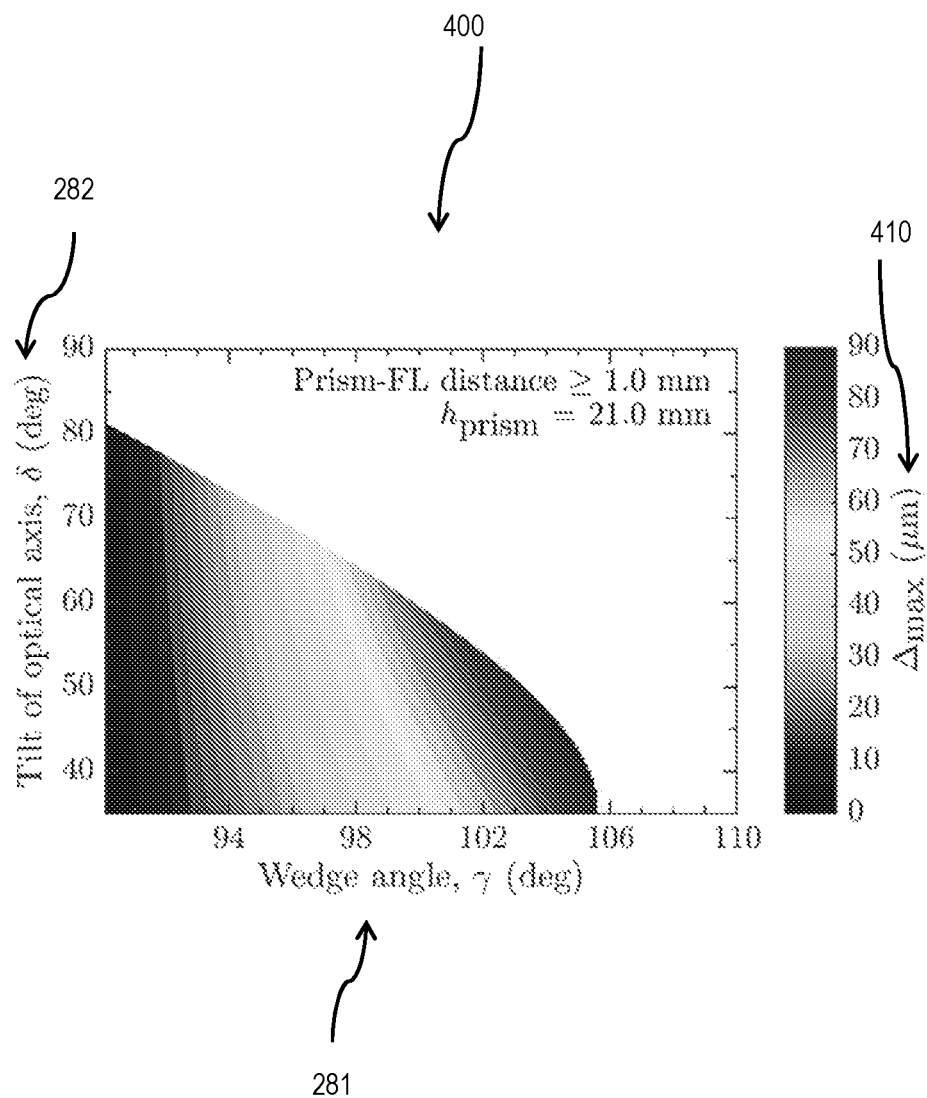
FIG. 4 shows an optimization plot for a gas imaging system, according to one or more embodiments presented herein.

The determination of at least some of these configuration parameters for various embodiments may, for example, be illustrated with reference to FIG. 4, which shows an optimization plot 400 for a gas imaging system according to one or more embodiments presented herein. In some embodiments, the optimization plot 400 is used to determine wedge angle γ 281 and orientation angle δ 282 of the optic axis of the first wedge, e.g. in the first prism 220. In the example of FIG. 4, the prism height is $h_{prism}$=21 mm and the distance between the back face of the second prism and the fringe localization plane 270 (Prism-FL distance) is ≥1 mm, as indicated in the top-right corner of FIG. 4. In some embodiments, a largest optical path difference $\Delta_{max}$ 410 is calculated by determining a critical sampling optical path difference $\Delta_{Nyquist}$ needed to reconstruct (per the Nyquist theorem) a desired minimum wavelength of infrared radiation $\lambda_{min}$ and the number of lenslets of the lenslet array 310 above the prism symmetry axis. In some embodiments, the optimal combination of parameters prism height, γ, δ and the distance between FL and the back side of the second prism that gives this $\Delta_{max}$ is determined, thus determining wedge angle γ 281 and orientation angle δ 282 of the optic axis of the first wedge.

According to various embodiments, these and other configuration parameters may be determined such that the BPI 200 is adapted to operate optimally in the infrared spectrum. Furthermore, the determination of these parameters according to various embodiments may optimize the BPI 200 and the optical system 300 for gas imaging applications.

In one aspect, the material for prisms 220 and 230 (e.g., Nomarski prisms) is, according to various embodiments, chosen to be a material that fulfills the requirements for providing birefringence and acceptable transmission in the infrared. Non-limiting examples of such materials applied in one or more embodiments described herein include rutile ($TiO_2$) and sapphire ($Al_2O_3$). Rutile has a birefringence of B=+0.17 at 3.38 micrometer and a transmission range of 0.4-5 micrometers. Sapphire has a relatively low birefringence of B=−0.008 at 3.33 micrometer and a transmission range of 0.5-5.5 micrometers. Both transmission ranges cover the mid-wave infrared region, where many hydrocarbons have absorption, as well as carbon dioxide and nitrous oxide, making both materials suitable for optical gas imaging of these gases. For example with sapphire, it is possible to manufacture thin as well as thicker crystal wedges, and also specify the optic axis orientation to sub-degree precision.

In another aspect, the dimensions and materials of the polarizers 210 and 250 and the half-wave plate 240 may be chosen to provide desired properties of the BPI 200 for infrared gas imaging. In one non-limiting example, the half-wave plate 240 may be selected to be 0.6 mm thick and made of cadmium thiogallate, and the polarizers to be of wire grid type on 2 mm thick silicon substrate. Both cadmium thiogallate and silicon transmit in the 3-5 micrometer region.

As for the lenslet array 310, the number of lenslets in the lenslet array 310, and hence the number of sub-images transmitted by the lenslet array 310, determines the spatial resolution of the hyperspectral images. For example, if the number of pixels on the FPA 330 is n×m, where n and m is the number of pixels per row and column, respectively, the sub-images, and hence the reconstructed hyperspectral images, will have a spatial resolution of n/N×m/M pixels, where N and M is the number of lenslets per row and column, respectively. The number of lenslets in the lenslet array 310 also determines the spectral resolution, as the number of spectral sample points in the reconstructed spectrum is proportional to the number of sub-images.

Hence, there is a trade-off between spectral and spatial resolutions; the former increases with the number of lenslets, whereas the latter decreases with the number of lenslets. According to various embodiments, the number of lenslets in the lenslet array 310 is chosen to achieve a desirable balance between the spectral and spatial resolutions for gas imaging, for example, based on the number of desired sampled points for gas imaging as discussed below with reference to Equations 21-22.

In another aspect, the number of lenslets per row (N) and the number of lenslets per column (M) are chosen in various embodiments to utilize as many of the pixels on the FPA as possible. In some embodiments, this may be achieved by matching the number of sub-images and their aspect ratio to the format (e.g., the number of pixels per row and column, also referred to as the pixel dimension) of the FPA 330. Thus, in one example, N and M are chosen so that the remainder of n/N and m/M is zero. The aspect ratio of the sub-images is n/N:m/M. In embodiments where N=M, the sub-images will have the same aspect ratio as the FPA, and the number of lenslets per row and column will be equal. In embodiments where N≠M, the aspect ratio of the sub-images will in general not be the same as that of the FPA, but in some embodiments it is chosen to be 1:1 (square format), which has the advantage of an x-y symmetry in the incident angles on the BPI 200 from each lenslet. In this case, the magnitude of the effect of incident angle on optical path difference will be the same in both directions for each sub-image.

In some embodiments, the FPA 330 may be a high quantum efficiency cooled type to maximize the sensitivity. In other embodiments, the FPA is an uncooled type such as microbolometer detectors. In order to get high resolution hyperspectral images, the FPA preferably has a large format. For example a large format for cooled detectors is n×m=1280×1024 pixels with a pitch of 15 micrometers. In an example, a number of lenslets was chosen to be N×M=10×8, matching the FPA aspect ratio of 5:4 and yielding square format images. In some embodiments, spatial resolution may be selected to be subordinate to spectral resolution, for example by choosing 10×8 lenslets rather than 5×4. This may be motivated by the fact that gas plumes inherently are quite "diffuse", whereby the spatial resolution needed to resolve them is relatively low, and that a high spectral resolution is needed to identify gas spectra. 10×8 lenslets creating 10×8 sub-images on a 1280×1024 FPA as in this example provide a spatial resolution of 128×128 pixels, in comparison with 5×4 lenslets providing a higher spatial resolution of 256×256 but correspondingly lower spectral resolution.

As for the determination of the number of sampling points for a desired spectral resolution, the sampling frequency needs to be at least twice the frequency of the signal to properly reconstruct the spectrum of a detected radiation without aliasing. For a broadband signal, the highest frequency component determines the Nyquist frequency. Put another way, the shortest wavelength $\lambda_{min}$ that can be reconstructed is equal to twice the difference in optical path differences between two consecutive interferogram points. Thus, $$\frac{\lambda_{min}}{2} = \Delta_{Nyquist} = \Delta(x_{i+1}, y_{i+1}) - \Delta(x_i, y_i), \quad \text{(Equation 21)}$$

where $\Delta_{Nyquist}$ is the critical sampling optical path difference. Because the intensity is independent of the sign of $\Delta$ (see Equation 18), only one side of the interferogram is unique and contributes to the resolution of the reconstructed spectrum. The spectral resolution, i.e. the smallest resolvable difference in wavenumber, is $\Delta\tilde{v}=1/\Delta_{max}$, where $\Delta_{max}$ is the largest optical path difference in the interferogram. Here, $\Delta_{max}=n_+\Delta_S$, where $n_+$ is the number of positive interferogram points, or, equivalently, the number of lenslets that sample positive optical path differences, and $\Delta_S$ is a selected sampling period.

An example of determining $\Delta_S$, $n_+$, and $\Delta_{max}$ for obtaining a desired interferogram will now be illustrated in accordance with one or more embodiments. As can be appreciated from the discussion above, smaller $\Delta\tilde{v}$ means better resolution, and minimizing $\Delta\tilde{v}$ is equivalent to maximizing $\Delta_{max}$. To be able to reconstruct a chosen $\lambda_{min}$, the sampling period is constrained by the Nyquist criterion, $\Delta_S \leq \Delta_{Nyquist}=\lambda_{min}/2$. The equality $\Delta_S=\Delta_{Nyquist}$ maximizes $\Delta_{max}$.

The number of positive interferogram points $n_+$ (which determines the number of lenslets in the lenslet array 310) is maximized when a purely single-sided interferogram is collected, i.e. when only positive $\Delta$ is sampled. Purely single-sided interferograms are, however, extremely sensitive to a type of error called phase errors. These errors, which can arise from misplacement of the zero optical path difference point, lead to errors in the reconstructed spectrum. In comparison, double-sided interferograms, which contain an equal number of positive and negative interferogram points, are very stable in regard to phase errors, and the output spectra essentially unaffected. Because purely single-sided interferograms are so sensitive to phase errors, the maximum attainable spectral resolution is, according to one or more embodiments, sacrificed for an increased stability against phase errors. In this regard, according to some embodiments, a mix of a few negative $\Delta$ points with a majority of positive $\Delta$ points are sampled to increase stability (also refer to as performing phase correction), or vice versa. In one non-limiting example, approximately 25% of the sampled interferogram points negative points to provide enough stability against phase errors. In another non-limiting example, approximately 25% of the sample points are positive interferogram points added to provide stability while approximately 75% are negative points.

Thus, in one specific example according to one or more embodiments, the desired spectral region for gas imaging was chosen to be 3-5 micrometers (e.g., to cover hydrocarbon, carbon dioxide and nitrous oxide absorptions, and other gases in the mid-wave infrared region), and hence, $\lambda_{min}=3$ micrometer and $\Delta_{Nyquist}=1.5$ micrometer. In this example, to maximize $\Delta_{max}$, $\Delta_S$ was set equal to $\Delta_{Nyquist}$, and the number of positive interferogram points was set to $n_+=(1-0.25)$ NM=0.75·80=60 to perform phase correction using 25% negative interferogram points, where the number of lenslets per row is N=10 and per column is M=8. The largest optical path difference in this example then becomes $\Delta_{max}=90$ micrometer, which yields a resolution of $\Delta\tilde{v}=111$ cm$^{-1}$. The total number of spectral points in the reconstructed spectrum will be $N_{\lambda,tot}=\Delta_{max}/\lambda_{min}=30$. These points will be evenly spread out in wavenumber space between $\tilde{v}_{min}=0$ cm$^{-1}$ and $\tilde{v}_{max}=1/\lambda_{min}=3333$ cm$^{-1}$. Therefore, the number of spectral points in the wavelength region between $\lambda_{min}=3$ micrometer and $\lambda_{max}=5$ micrometer will be $$N_\lambda = N_{\lambda,tot} \frac{\frac{1}{\lambda_{min}} - \frac{1}{\lambda_{max}}}{\tilde{v}_{max} - \tilde{v}_{min}} = 30\frac{3333 - 2000 \text{ cm}^{-1}}{3333 - 0 \text{ cm}^{-1}} = 12. \quad \text{(Equation 22)}$$

The configuration of optical system 300, including the prism height $h_{prism}$, the prism wedge angle γ 281, the optic axis inclination angle δ 282, and the position of the fringe localization plane 270, will now be discussed in further detail according to various embodiments of the disclosure. In general, according to various embodiments, the height of the prisms $h_{prism}$, the wedge angle γ 281, and the optic axis inclination angle δ 282 may be chosen to achieve a desired largest optical path difference $\Delta_{max}$ in the interferogram. The height of the prisms $h_{prism}$, the wedge angle γ 281 and the optic axis inclination angle δ 282 in turn determine the distance between the BPI 200 and the fringe localization plane 270 (also referred to herein as the BPI-FL distance).

Figure 5A:
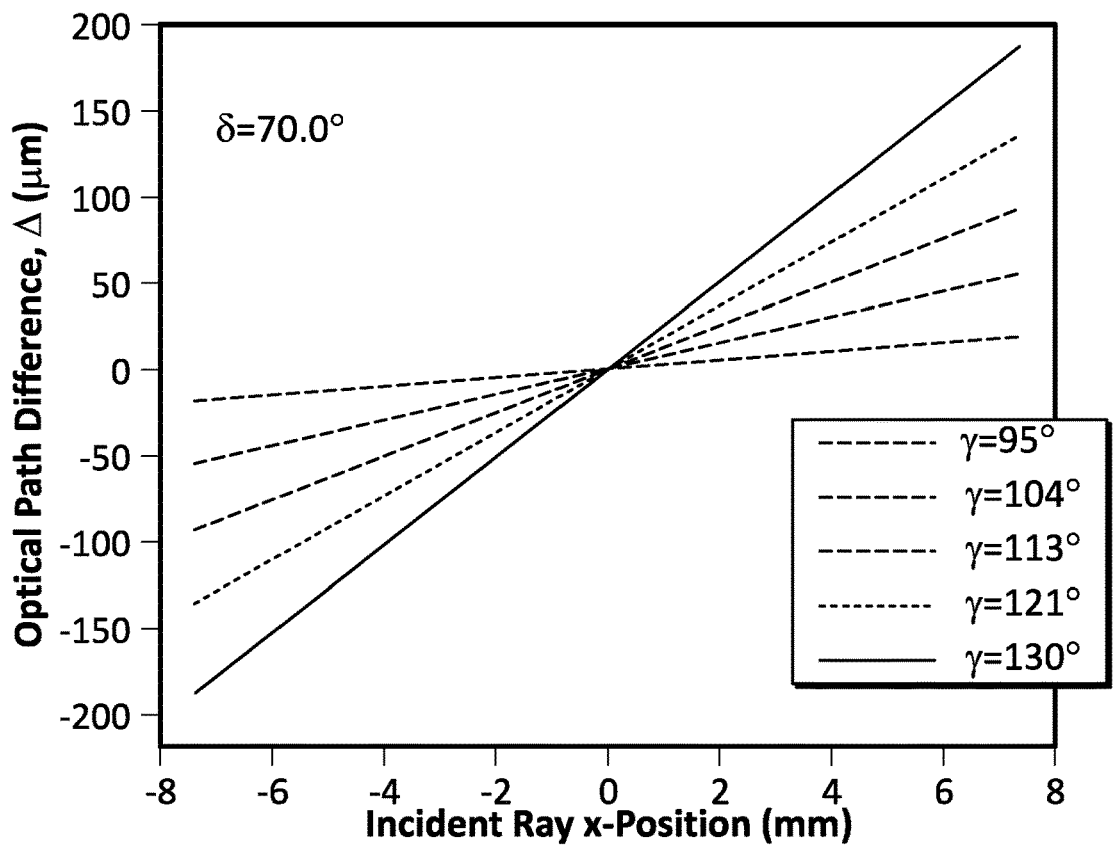
FIGS. 5A and 5B show example plots of an optical path difference $\Delta$ for different combinations of a prism wedge angle $\gamma$ and an optic axis inclination angle $\delta$ for a BPI, according to one or more embodiments presented herein.
Figure 5B:
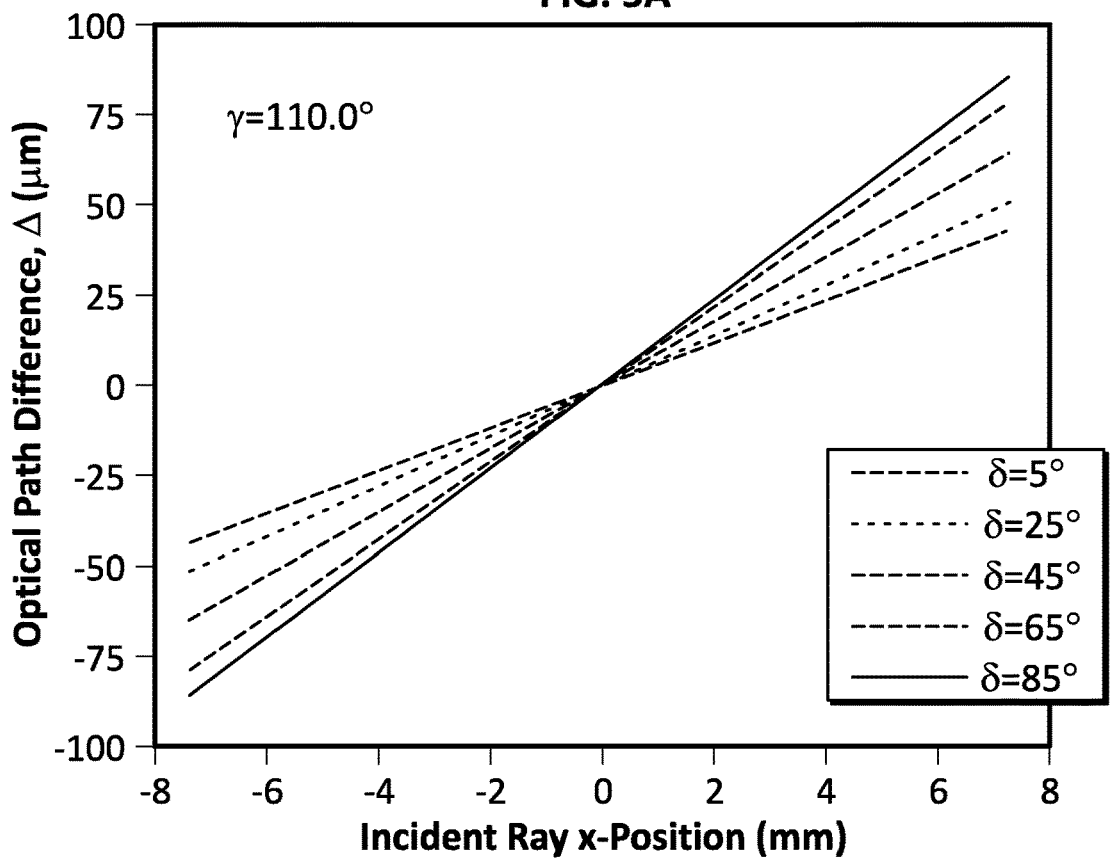

To determine the wedge angle γ 281 and the optic axis inclination angle δ 282 for achieving a suitable largest optical path difference $\Delta_{max}$, experiments have been carried out in connection with the present disclosure. In this regard, FIGS. 5A and 5B show example plots of the optical path difference $\Delta$ as a function of the x-position of normally incident rays on a BPI (with a height of 15 mm in this example) for different combinations of γ and δ, in accordance with an embodiment of the disclosure. In particular, FIG. 5A shows a plot of $\Delta$ for five different values of γ while δ is fixed at 70°, and FIG. 5B shows a plot of $\Delta$ for five different values of δ while γ is fixed at 110°. As the inventors of the present disclosure have verified through experiments and shown in FIGS. 5A and 5B, there is a general trend of increasing optical path differences with both γ and δ, and a strong linearity over all combinations of the parameters. Additionally, γ has a greater impact on $\Delta$ than δ has.

Figure 6A:
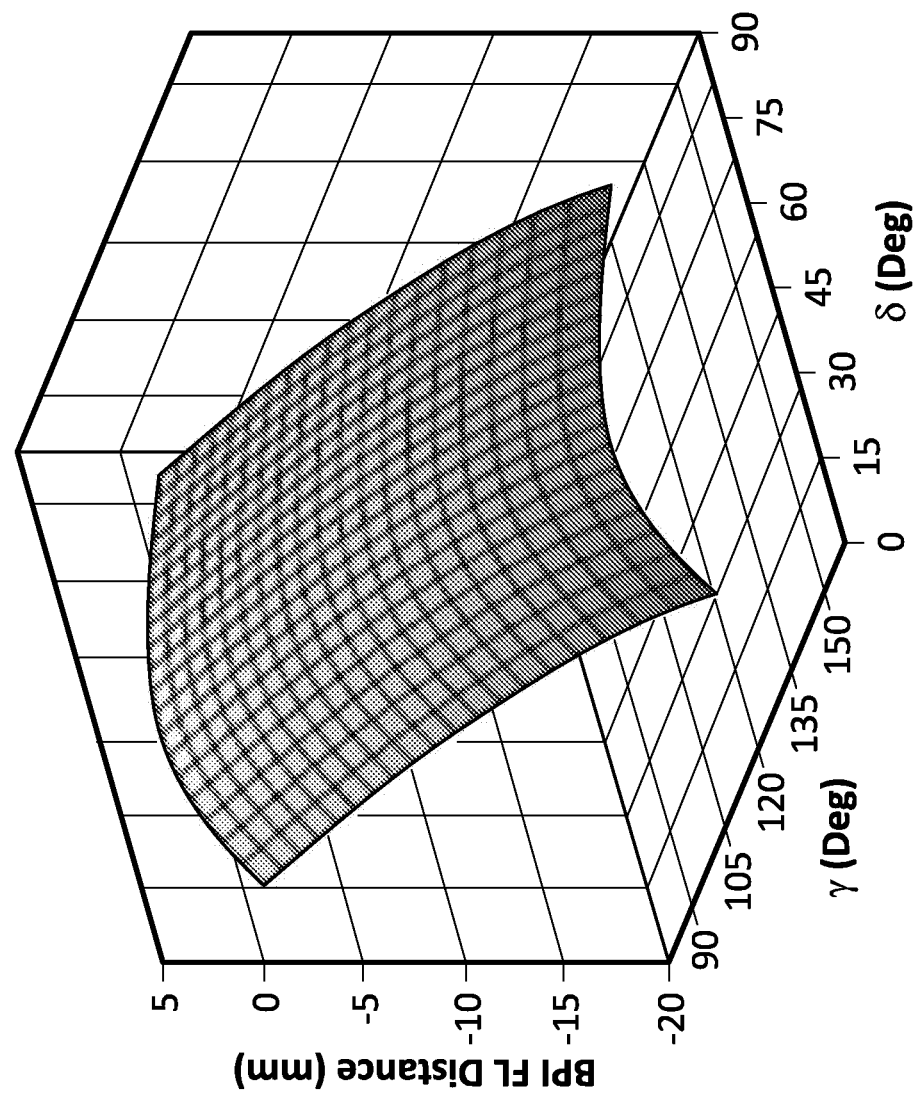
FIG. 6A shows an example plot of the distance between a BPI and an interference fringe localization plane as a function of a prism wedge angle $\gamma$ and an optic axis inclination angle $\delta$ for a fixed prism height, according to one or more embodiments presented herein.
Figure 6B:
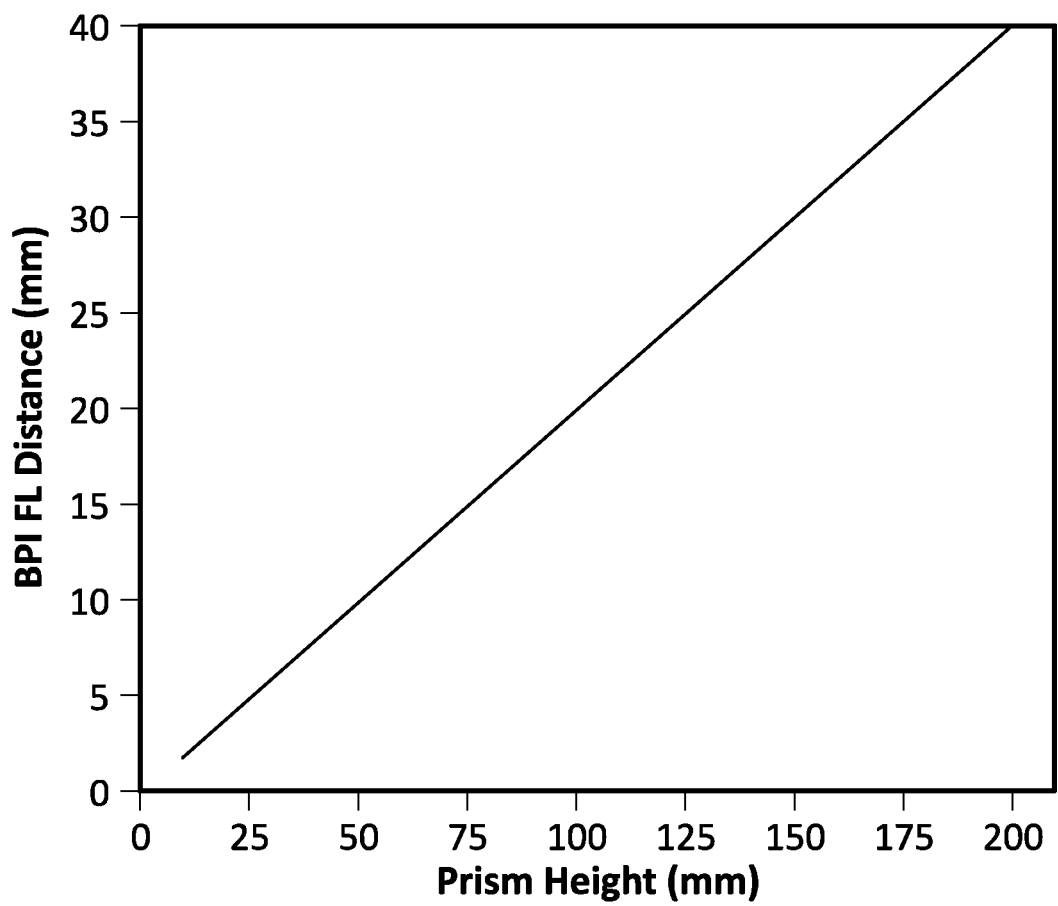
FIG. 6B shows an example plot of the distance between a BPI and an interference fringe localization plane as a function of a prism height for a fixed prism wedge angle $\gamma$ and optic axis inclination angle $\delta$, according to one or more embodiments presented herein.

Additional experiments carried out by the inventors of the present disclosure also show how the distance between the BPI 200 and the fringe localization plane 270 (the BPI-FL distance) may be determined as a function of γ, δ, and the prism height. For example, FIGS. 6A and 6B show example plots of the BPI-FL distance respectively as a function of γ and δ for a fixed prism height of 20 mm and as a function of the prism height for fixed γ=90.1° and δ=35°. As shown in FIG. 6A and according to the experiments carried out by the inventors, for this example the maximum distance occurs when δ=35° and γ ↘ 90° (γ cannot be exactly 90° as this would mean infinitely thin prisms).

The distance between the BPI 200 and the fringe localization plane 270 is relevant because, as discussed above, one aspect of the BPI design is the placement of the FPA 330 at the fringe localization plane 270. For embodiments in which cooled detectors are used to implement the FPA 330, an enclosed volume (e.g., a Dewar cooler assembly), which is typically about 30 mm long, is present before the pixel array to cool the pixel array. Thus, for these embodiments, the distance between the BPI 200 and the fringe localization plane 270 would thus need to be at least 30 mm for the fringe localization plane 270 to coincide with the pixel array. As shown in FIG. 6B, the corresponding prism height to provide this distance would be at least about 150 mm. The prism height for other desired BPI-FL distances may be determined in a similar manner according to embodiments.

Depending on the specific implementation examples, however, the resulting size of the prisms 220 and 230 may be too large relative to the size of the FPA 330 (i.e., the FPA 330 is too small to cover all of the transmitted radiation through the prisms 220 and 230). In this regard, as discussed above, optical system 300 according to some embodiments include a relay lens system (e.g., relay lens system 320) between the BPI 200 and the FPA 330 which relays the interference fringes and the sub-images to the FPA 330. With the introduction of the relay lens system, the fringe localization plane 270 no longer has to coincide with the FPA 330, which means that the position of the plane 270, and therefore the height of the prisms, the prism wedge angle γ 281, and the optic axis inclination angle δ 282, may be chosen more freely in these embodiments. As another benefit, the fringe localization plane 270 may be placed outside of any volume, for example the prisms 220 and 230, to avoid imaging of any impurities within the volume. Furthermore, it may advantageously be placed far away from any optical surfaces to reduce stray light from multiple reflections, and to avoid imaging of dust particles on the surface.

Thus, as discussed with reference to FIGS. 5A-5B and 6A-6B, the BPI 200 according to various embodiments is configured with a combination of the prism height $h_{prism}$, the prism wedge angle γ 281, and the optic axis inclination angle δ 282 that provides a desired optical path difference $\Delta_{max}$ (e.g., corresponding to a desired spectral band and spectral resolution for gas imaging) and places the fringe localization plane 270 at a desired distance from the BPI 200. To determine the desired prism height, wedge angle γ 281, and optic axis inclination angle δ 282 according to various embodiments of the disclosure, an optimization method was performed through simulations in which rays were traced through the BPI 200 for all combinations of γ and δ, starting with an initial value for the prism height $h_{prism}$.

For example, simulations were performed to determine these configuration parameters for the desired largest optical path difference $\Delta_{max}$=90. For each simulation where the BPI-FL distance was greater than a predetermined threshold, the largest optical path difference $\Delta_{max}$ was calculated. If no combination of γ and δ yielded $\Delta_{max} \geq 90$ micrometer, the prism height was increased and the simulations repeated. If the largest $\Delta_{max} \gg 90$ micrometer, the prism height was instead decreased and the simulations repeated. Finally, if the largest $\Delta_{max} \approx 90$ micrometer, the combination of γ, δ, prism height, and fringe localization plane distance that gave the value closest to 90 micrometer was chosen.

Referring again to FIG. 4, the example optimization plot 400 represents one result of such simulations according to embodiments, used to determine the prism height $h_{prism}$, the prism wedge angle γ 281, and the optic axis inclination angle δ 282 that provides $\Delta_{max} \approx 90$ micrometer and places the fringe localization plane 270 at least 1.0 mm from the BPI 200. In this example, the prism height $h_{prism}$ was determined to be 21.0 mm, and a range for the prism wedge angle γ 281 and the optic axis inclination angle δ 282 that yields $\Delta_{max} \approx 90$ micrometer and a fringe localization plane distance ≥1.0 mm is shown in the optimization plot 400, such as for example γ=103.8° and δ=48.3° yielding $\Delta_{max}$=89.98 micrometer and a fringe localization plane distance of 1.0 mm.

According to some embodiments, the prism wedges (e.g., prisms 220 and 230) may be cut, so that they are truncated without affecting the properties and operations of the BPI 200 with respect to the largest optical path difference $\Delta_{max}$ or the BPI-FL distance. As discussed above, the prisms in some embodiments generate a double-sided interferogram, where negative (or positive) interferogram points are not sampled or only a few are sampled for phase correction, and thus the portion of the prisms corresponding to such unused interferogram points may be removed.

For example, both positive and negative optical path differences Δ are shown in FIGS. 5A and 5B above, which may be generated by the Nomarski prisms with two wedges having the same thickness or other prisms with similar characteristics according to some embodiments. Here, the optical path difference Δ is zero for x=0 mm, which corresponds to the symmetry axis of the Nomarski prisms, while the optical path difference Δ is positive above the axis and negative below the axis. For a specific example where approximately only 25% interferogram sample points are negative (e.g., for phase correction), approximately only 25% of the prism height (corresponding to the 25% of the sample points which are negative) needs to be below this symmetry axis and the rest may be above it. To achieve this, the prism wedges can be cut so that they are truncated, which beneficially saves material that would otherwise have been unutilized and permits a more compact design for the BPI 200 and the optical system 300 of the thermal imaging system 130.

Figure 7:
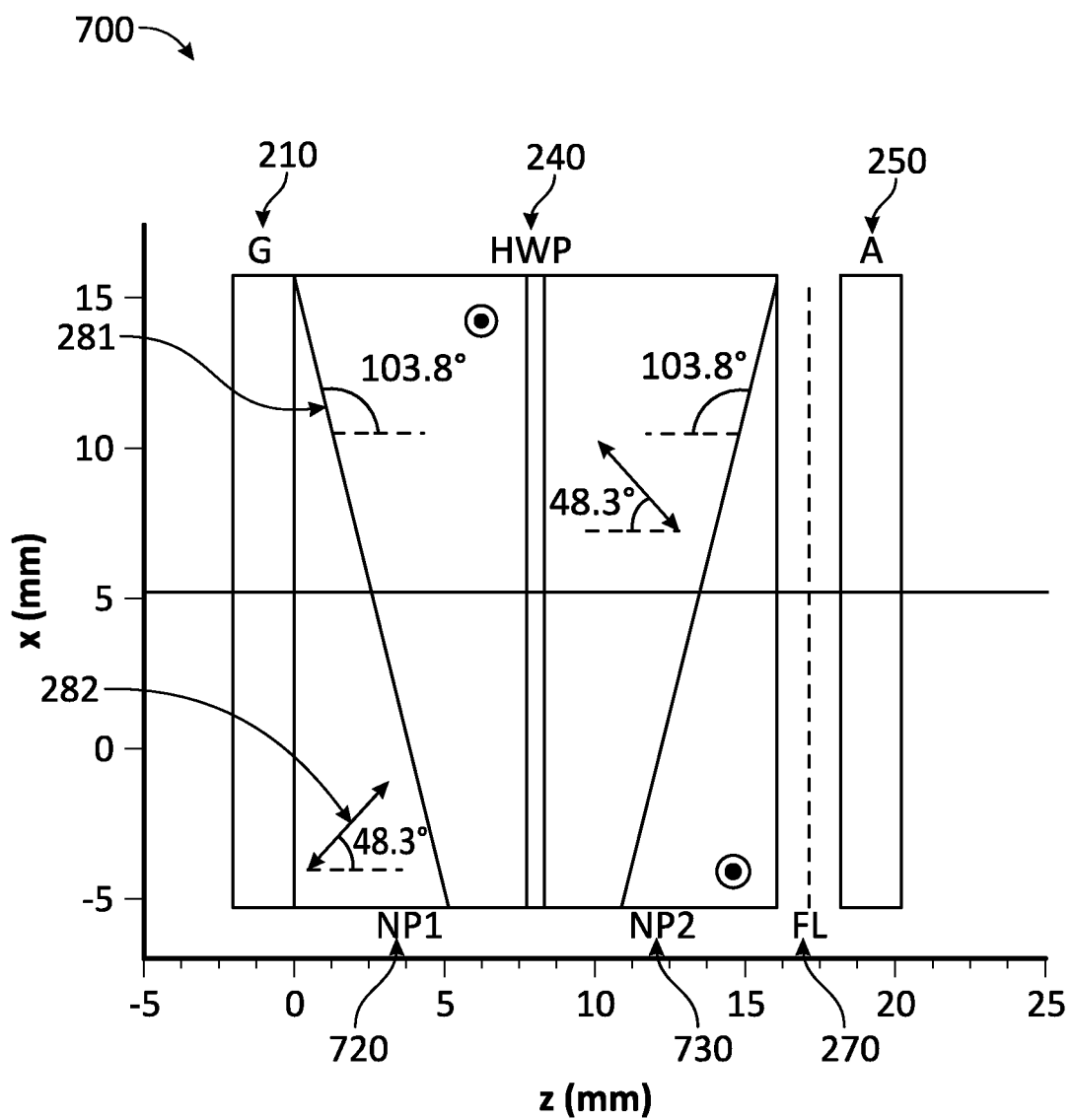
FIG. 7 shows a BPI having truncated prisms, according to one or more embodiments presented herein.

An example of such truncated prisms 720 and 730, and hence a truncated BPI 700, is illustrated in FIG. 7 in accordance with an embodiment of the disclosure. Compared with the BPI 200 of FIG. 2, the prisms 720 and 730 are truncated such that about 25% of the prism height (e.g., 5 mm out of 20 mm) is below the symmetry axis while about 75% of the prism height (e.g., 15 mm out of 20 mm) is above. As one skilled in the art would understand from the disclosure, the prisms 220 and 230 of the BPI 200 may be truncated to leave a proportion of the prism height below the symmetry axis (or above the symmetry axis if positive interferogram points are to be used for phase correction instead of negative interferogram points) that corresponds to other desired proportions of the sampled interferogram points (e.g., in a range of 10%-30% or 0% to 50%, such as 10%, 30%, 50%, or 0% for no phase correction) used for phase correction as used other implementation examples according to various embodiments.

Figure 8:
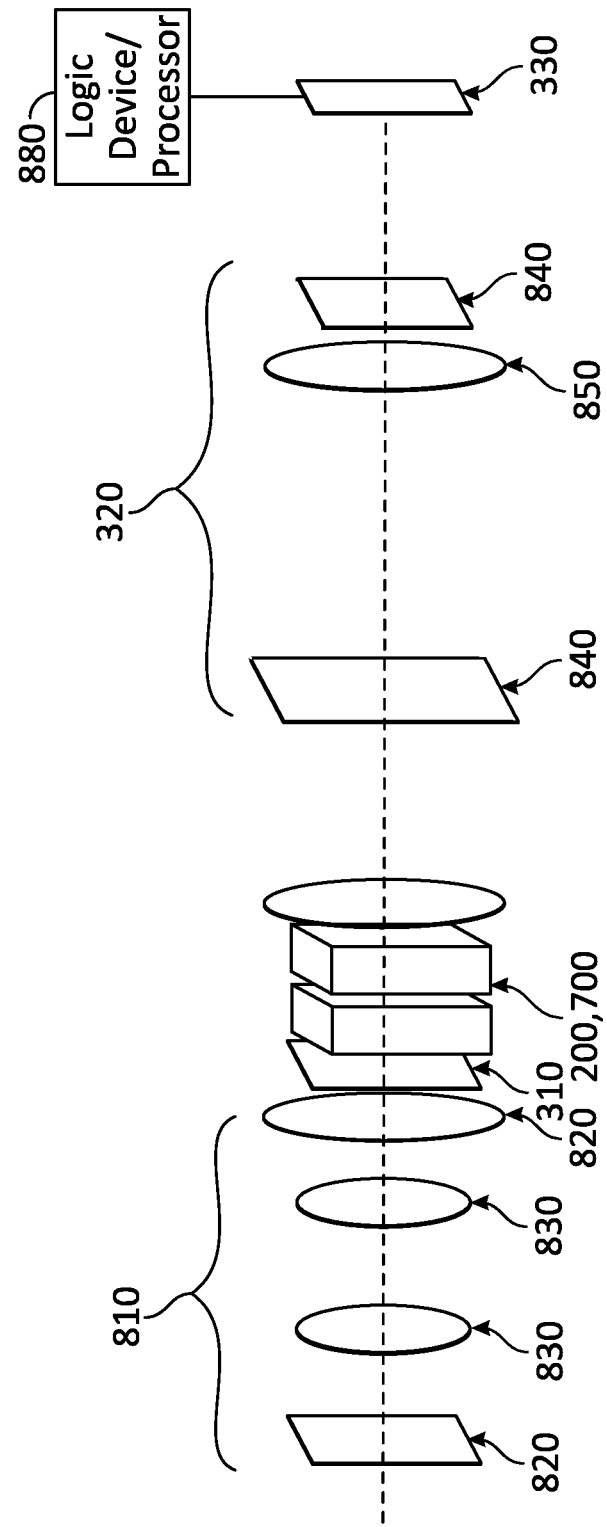
FIG. 8 shows schematically a gas imaging system, according to one or more embodiments presented herein.
Figure 9:
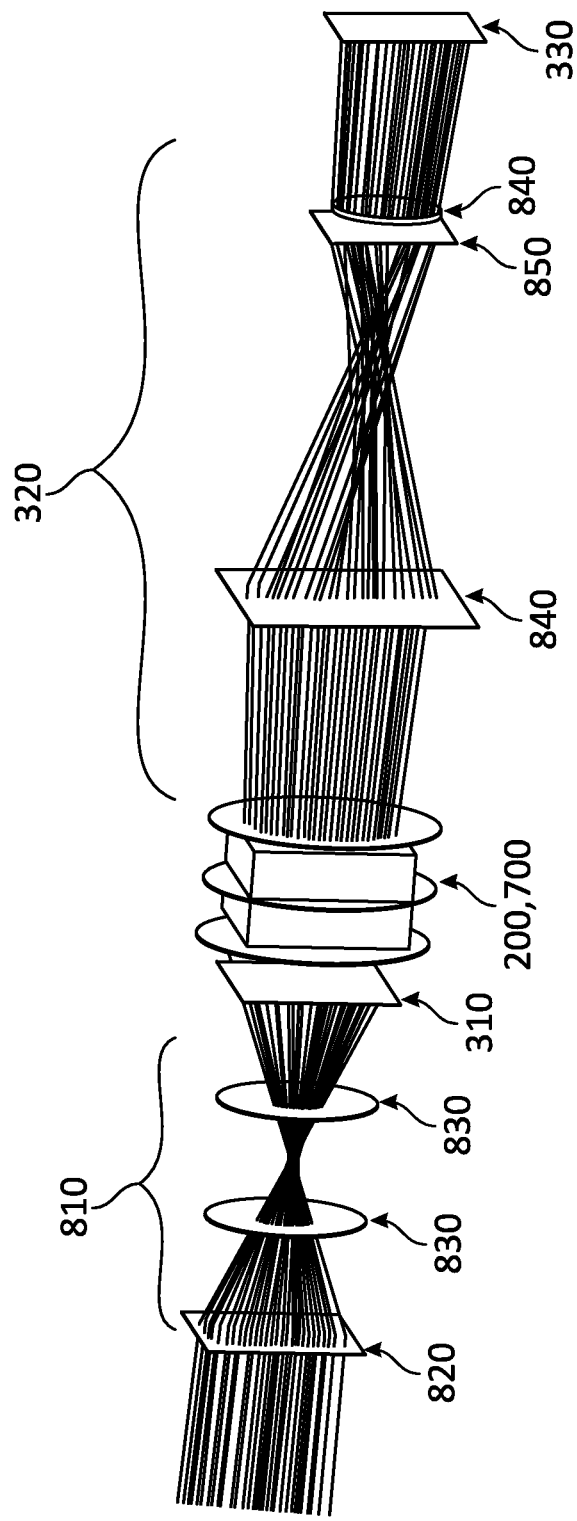
FIG. 9 shows tracing of rays through the gas imaging system of FIG. 8, according to one or more embodiments presented herein.

FIG. 8 and FIG. 9 show schematically a gas imaging system 800, such as the thermal imaging system 130, in accordance with embodiments of the disclosure. In one or more embodiments, the gas imaging system 800 (or the thermal imaging system 130) comprises the BPI 200 or 700, the lenslet array 310, the relay lens system 320, and the FPA 330 discussed above for various embodiments, and may further comprise an afocal telescope 810 designed with one or more objective lenses 820 to control the field of view and one or more heat and stray light baffles 830 to reduce noise caused by stray heat and/or light. FIG. 9 also shows tracing of rays of thermal radiation from an object in an observed scene (from left in FIG. 9) and traveling through the optical components (e.g., the afocal telescope 510, the lenslet array 310, the BPI 200 or 700, and the relay lens system 320) to reach the FPA 330.

In some embodiments, all or some of components of gas imaging system 800 may be silver or AR-coated to maximize SNR and minimize polarization changes. In some embodiments, one or more supporting surfaces may be coated with high-emissivity coating to reduce reflections and stray light. In some embodiments, the FPA 330 may be provided in a cooled Dewar, and the acceptance angles of the cold shield of the Dewar may be matched to the exit angles of thermal radiation from the optical components.

As a specific example according to embodiments, the afocal telescope 810 comprises two objective lenses 820 and two baffles 830. In this example, both objective lenses 820 may have a focal ratio of 1 and may be placed with a separation of two focal lengths when focused at infinity, so that they share a common focal point between them. In addition, the two baffles 830 are configured to replace a conventional field stop having a single field stop in between two objective lenses 820. This is to reduce stray light coming from the baffles 530 themselves and other parts of the gas imaging system 800.

More specifically, the baffles 830 may be placed away from the focal point, thereby reducing stray light coming from the baffles 830, the interior walls of a housing enclosing the gas imaging system 800, and other components in the gas imaging system 800. Note that all components in the gas imaging system 800, except the cooled detector, can be assumed to be at room temperature and thus emit infrared radiation corresponding to the room temperature. For example, the baffles 830 themselves can be approximated as black bodies, and thus radiate according to Planck's law. In this regard, at room temperature, a non-negligible fraction of the total energy is emitted internally by the components of the gas imaging system 800 in wavelengths that coincide with the spectral response of the detector. As discussed above, the baffles 830 may reduce the influence of such internally emitted infrared radiation on the FPA 330.

Furthermore, the objective lenses 820 and the baffles 830 of the afocal telescope 810 are configured to restrict the field of view to obtain accurate optical path differences Δ. In this regard, experiments and simulations have been carried out in connection with the present disclosure to determine the dependence of optical path difference on incident angle for the system. For example, rays were traced through the whole system and the optical path difference was calculated in these experiments and simulation. First, the rays were required to be normally incident on the first objective lens 820 farthest from the BPI 200 or 700, which means that they were normally incident on the lenslet array 310 as well. In addition, all rays were required to go through the same lenslet. For each ray, the incident angle on the BPI 200 or 700 and the optical path difference Δ was calculated.

The ideal case, which is also the case the BPI is designed for in one or more embodiments, is when all rays are normally incident on it. Thus, the figure of interest is the deviation from this case for rays with non-zero incident angle. The difference in Δ may be shown as a function of the incident angle on the BPI 200 or 700. The difference was relatively small compared to the sampling period $\Delta_S$=1.5 micrometer, and always less than 15% of it. The same calculation was repeated for rays incident on the first objective lens 820 at 5°. The non-zero incident angle on the first objective lens 820 makes the angles incident on the BPI 200 or 700 larger than in the first case. Hence, the deviations are larger. In this case, the differences can be as large as 30% of the sampling period $\Delta_S$. Therefore, according to some embodiments, the objective lenses 820 and the baffles 830 of the afocal telescope 810 are configured to restrict the field of view, for example, restricted to be within 5°, 10°, or other suitable angles.

The lenslet array 310, as discussed above for various embodiments, comprises an array of lenslets each forming a substantially identical sub-image of infrared radiation received at the lenslet array 310 (e.g., infrared radiation received from a scene containing gas). The number of lenslets in the lenslet array 310 is chosen to achieve desired spectral and spatial resolutions in response to the number of pixels (e.g., the spatial resolution) provided by the FPA 330 and the gas absorption/emission spectra of interest, as discussed above for various embodiments. In one specific example where 10×8 lenslets are provided in the lenslet array 310 to form 10×8 sub-images, the diameter of each lenslet may be equal to the height of the prisms divided by 10.

The relay lens system 320 comprises one or more relay lenses 840 according to various embodiments. In the example shown in FIG. 8, the relay lens system 320 comprises two relay lenses 840, which together relay the sub-images and the interference fringes created by the lenslet array 310 and the BPI 200, respectively, to the FPA 330. In some embodiments, the FPA 330 may be a cooled detector, and a cold shield aperture 850 may be mounted on the FPA 330 at a fixed distance to insulate the detector from the rest of the system.

In some embodiments, the focal length of the lenslets in the lenslet array 310 and the distance between the lenslet array 310 and the BPI 200 may be adjusted so that the images formed by the lenslets were focused exactly at the fringe localization plane 270. In this way, the intermediate image plane may be made coincident with the fringe localization plane. Furthermore, the focal length and position of the first relay lens 840 closer to the BPI 200 may be adjusted so that its focal plane also is coincident with the fringe localization plane 270, thus relaying both the sub-images and the interference fringes. The position and the focal length of the second relay lens 840 closer to the FPA 330 may be adjusted so that all rays are transmitted through the cold shield aperture 850. The FPA 330 is positioned at the final image plane. The focal length of the lenslets and the relay lenses 840 may further be adjusted so that the sub-images fill the entire FPA 330 without overlapping, thus maximizing the number of utilized pixels. Thus, in one specific example, the lenslets were set at a focal length of f/7.34, the first relay lens 840 at f/1, and the second relay lens 840 at f/2.3. The total length of the gas imaging system 800 in this example was approximately 200 mm.

The inventors of the present disclosure have verified the operations and characteristics of the gas imaging system 800 according to various embodiments discussed above (e.g., the overall operations and characteristics of a snapshot hyperspectral camera system), through experiments, modeling, and simulations performed in connection with the present disclosure. For example, those experiments, modeling, and simulations provided a proof-of-concept showing how the BPI 200 could be combined with auxiliary optics to create a snapshot hyperspectral imaging system such as the gas imaging system 800 according to embodiments of the disclosure.

More specifically, the gas imaging system 800 according to various embodiments were modeled in 3D to simulate interferograms and spectra using all incident rays. Ray tracing calculations were performed assuming that the incident plane, defined by the incident wave vector $\hat{k}_1$ and the surface normal $\hat{n}$, was coincident with the xy-plane, $\hat{n}$ was parallel to the x-axis, and the yz-plane was coincident with the surface of the prism. At the slanted wedge intersections of the prisms, the wedge angle may be added or subtracted from the incident and refracted angles to correct for the normal not being parallel to the z-axis. In this regard, the calculation was carried out in a new coordinate system x'y'z' that was rotated about the y-axis to align the z'-axis with the surface normal. After the calculation, the system was rotated back and the angles in the original xyz-system could be used for subsequent calculations. The same method was used to calculate rays incident with a non-zero y-component in the 3D model. Here, the coordinate system was rotated to align the z'x'-plane with the incident plane, with the z'-axis parallel to the surface normal.

The optical path length of each ray is then:

$$L = \Sigma_{i=1}^{4} n_i \sqrt{(z_{i+1}-z_i)^2 + (x_{i+1}-x_i)^2 + (y_{i+1}-y_i)^2} + \text{sgn}(z_{FL}-z_5) n_5 \sqrt{(z_{FL}-z_5)^2 + (x_{FL}-x_5)^2 + (y_{FL}-y_5)^2}, \quad \text{(Equation 23)}$$

where $(x_i, y_i, z_i)$ is the interface point with interface i, starting from the first prism's surface, $n_i$ the refractive index for the ray in the region between interface i and i+1, and $(x_{FL}, y_{FL}, z_{FL})$ the intersection point with the fringe localization plane 270.

As discussed above for various embodiments, the BPI 200, 700 is rotated an angle $\psi$ about the z-axis to make the optical path difference dependent on both x and y. To make the sampling period constant between each sampling point, $\Delta$ needs to vary linearly between each subsequent sub-image, $$\Delta(x_i+1, y_i+1) - \Delta(x_i, y_i) = \Delta_s \forall_i \in \{1, 2, N \times M-1\}. \quad \text{(Equation 24)}$$

Because $\Delta$ is linear in x, this is achieved when $\psi = -\arctan(1/M)$ according to various embodiments, where the minus sign makes $\Delta$ decrease with y instead of increase. For example, with M=8 as illustrated above for some examples, this angle is determined to be $\psi = -7.125°$ according to various embodiments.

Continuing with the example in which the number of lenslets in the lenslet array 310 is 10×8 and the prism height is determined to be 21 mm, there were 10×8 equidistant rays in a rectangular grid with a spacing of 2.1 mm, corresponding to the diameter of the lenslets. The case where rays normally incident on the lenslet array 310 and go through the center of each lenslet was simulated. The interferogram resulting from the simulation is ideal, in the sense that all rays are normally incident on the BPI 200, 700. The 80 optical path differences obtained from this experiment and simulation had a minimum of $\Delta_{min} = -32.5$ micrometer, a maximum of $\Delta_{max} = 90.0$ micrometer, and a mean sampling period of $\Delta_S = 1.55$ micrometer with a standard deviation of $2.71 \cdot 10^{-10}$ micrometer.

Using such a set of 80 optical path differences, different sources were simulated to generate different interferograms, for example, according to Equation 18 above and with $I(\tilde{v})$ set to some source spectrum function. In one example, the source was a black body, and thus in this example $I(\tilde{v})$ is Planck's law, $$I(\tilde{v}) = B(\tilde{v}, T) = 2hc^2\tilde{v}^3 \frac{1}{e^{hc\tilde{v}/k_B T} - 1}, \quad \text{(Equation 23)}$$

where h is Planck's constant, c is the speed of light, $k_B$ is Boltzmann's constant, and T is the temperature, which in this case was set to T=300 K. The source spectrum was normalized prior to calculating the interferogram.

The spectrum was reconstructed using the Cooley-Tukey fast Fourier transform algorithm. This algorithm requires that the number of sample points is a power of two. Therefore, a standard zero-filling procedure of the interferogram was performed to increase the number of points from 80 to the nearest power of two, $2^7=128$. This increase in the number of points in the spectrum gives an apparent smaller $\Delta\tilde{v}$, i.e. an apparent higher resolution. However, the added zeros do not add any new information, as the zero-filling has the effect of interpolating the spectrum. Thus, the effective resolution is based on the number of sample points prior to zero-filling. In the calculations, a reconstructed spectrum was overlaid on the original black body source spectrum for 3-5 micrometer. Based on this overlaying and comparison, the inventors have verified that the reconstruction was very accurate and indistinguishable from the original spectrum.

Given the accuracy of reconstructing a black body spectrum, some embodiments of the disclosure may automatically set the emissivity of the source when performing optical gas imaging through a comparison against the black body spectrum. In the absence of gas absorption, a measured deviation from an expected black body spectrum at the known temperature may be attributed to the emissivity of the object, and thus be used to set the emissivity of a background scene or object for gas imaging.

In another spectral reconstruction example according to embodiments, the source was two closely spaced monochromatic lines. The spacing of the lines is equal to the theoretical resolution $\Delta\tilde{v}=111$ cm$^{-1}$, which at 3.3 micrometer corresponds to 0.13 micrometer. The reconstructed peaks were partly overlapping, but the two lines may still be resolved, thereby affirming that the reconstruction according to embodiments of the disclosure is sufficiently accurate.

In various embodiments, the gas imaging system 800 (e.g., a snapshot hyperspectral camera) may be configured to detect and/or identify gases with absorption or emission in a desired spectral band. As discussed above, the FPA 330 may be configured to have a spectral response range covering at least the desired spectral band, the configuration of optical system 300, including the prism height $h_{prism}$, the prism wedge angle γ 281, the optic axis inclination angle δ 282, may be chosen to provide a corresponding largest optical path difference $\Delta$max, hence the corresponding λmin for the desired spectral band, and the lenslet array 310 may comprise lenslets in a number that provides a suitable spectral resolution and spatial resolution for the FPA 330 and the desired spectral band. Furthermore, the gas imaging system 800 according to one or more embodiments may include a logic device 880, such as a processor (e.g., a general-purpose processor, a digital signal processor, or a microcontroller), a programmable logic device (e.g., a field-programmable gate array), or an application-specific integrated circuit, that is communicatively coupled to the FPA 330 and configured to reconstruct hyperspectral images from the sub-images and the interference fringe pattern (e.g., the interferogram) captured at the FPA 330. In some embodiments, the logic device 880 may be provided in an external device separate from the optical system (e.g., the FPA 330, the BPI 200 or 700, the lenslet array 310, the relay lens system 320, and/or the afocal telescope 810) of the gas imaging system 810, and may be configured to communicate with the FPA 330 via wired or wireless network or connection, or otherwise receive the captured thermal image (e.g., via a removable storage).

In this regard, the logic device 880 may be configured to construct (e.g., reconstruct, determine, or generate) a set of hyperspectral images (e.g., a set of thermal images of a scene in a plurality of different spectra, wavelengths, or frequencies) covering the desired spectral band, based on the array of sub-images which are captured by the FPA 330 and together represent an interferogram of the thermal radiation from the scene. In some embodiments, the logic device 880 may be configured to reconstruct hyperspectral images by applying a Fourier transform on the group of pixels at the same relative position in the sub-images captured by the FPA 330 and repeating the Fourier transform for all pixel positions in the sub-images, as discussed with reference to Equations 16-20, FIG. 3B, and herein elsewhere. Thus, in one example, the logic device 880 may be configured to perform the Cooley-Tukey fast Fourier transform on all pixels grouped by the same relative position in the sub-images captured by the FPA 330, with appropriate zero-filling to increase the sample points to the nearest power of two.

In some embodiments, the logic device 880 may be further configured to detect and/or identify one or more gases of interest from the set of constructed hyperspectral images, and/or configured to present user-viewable images based on the set of constructed hyperspectral images to enable a user to detect and/or identify a presence of one or more gases of interest. For example, the logic device 880 may be configured to compare the intensity changes (e.g., due to absorption or emission by one or more gases within the target spectral band) in the set of constructed hyperspectral images against absorption/emission profiles or database (e.g., stored in a memory of the gas imaging system 800) to detect and/or identify certain gases. Additionally or alternatively, the logic device 800 may be configured to present a visual representation, such as a combined image (e.g., fused, superimposed, or tiled images) of the set of constructed hyperspectral images, which a user can view to identify or detect one or more gases of interest in real time, for example. In some embodiments, the logic device 800 may be configured to indicate the presence, type, location, and/or shape of the identified gases in such a visual representation by differing highlights in color or shade.

In some embodiments, the logic device 880 may comprise a processor configured to execute machine-readable instructions (e.g., code portions) stored on a non-transitory machine-readable medium to receive the captured sub-images from the FPA 330, reconstruct hyperspectral images, and/or identify a gas of interest from the hyperspectral images.

Figure 10:
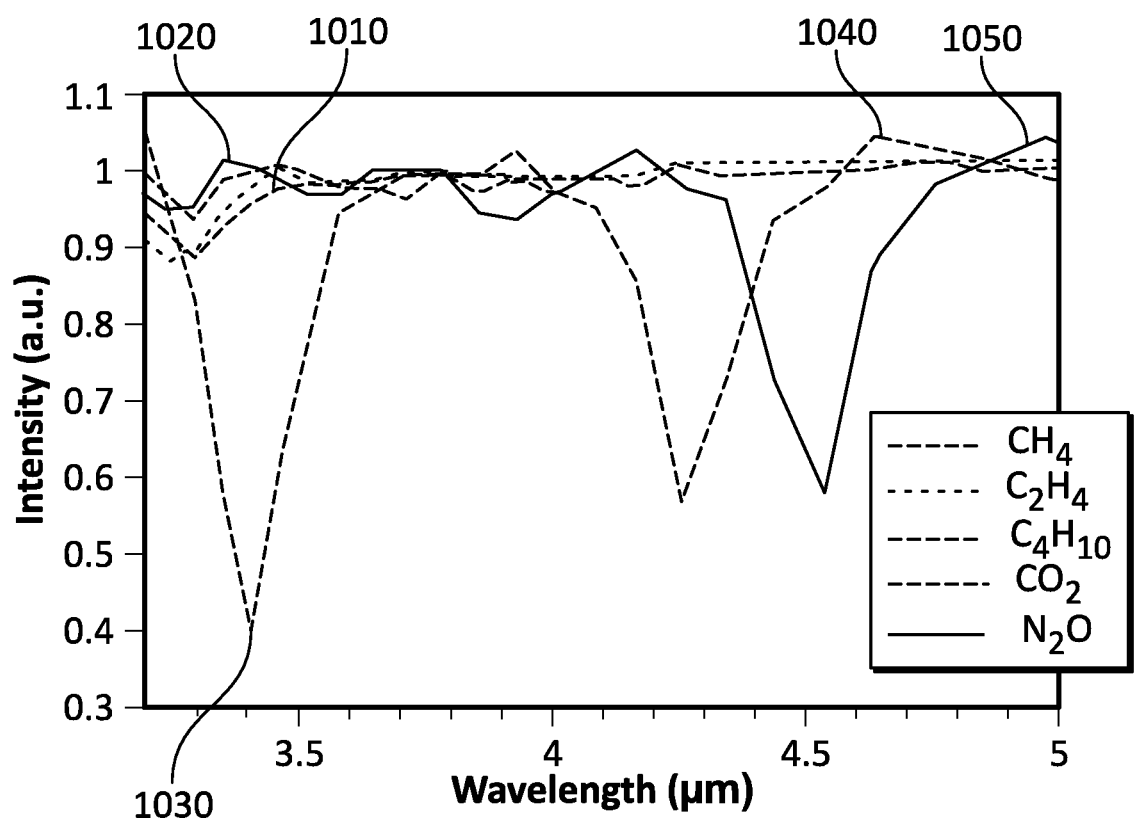
FIG. 10 shows reconstructed spectra for various gases over the wavelength from 3 to 5 micrometers, according to one or more embodiments presented herein.

In one implementation example, the gas imaging system 800 is configured to detect and/or identify gases having their absorption/emission spectra in the 3-5 micrometer band. This example according to one or more embodiments has been tested in its ability to detect and identify gases in this spectral band, including methane ($CH_4$), ethane ($C_2H_4$) butane ($C_4H_{10}$), carbon dioxide ($CO_2$), and nitrous oxide ($N_2O$). FIG. 10 shows reconstructed spectra for these gases, in accordance with an embodiment of the disclosure. It should be understood that although FIG. 10 illustrates the gas spectra for a single point rather than 2D images for ease of understanding and improved clarity, the embodiments of the disclosure can reconstruct 2D hyperspectral images as discussed herein.

In FIG. 10, the reconstructed spectrum 1010 for methane, representing intensity variations over the wavelength from 3 to 5 micrometers due to absorption of infrared radiation, appears to produce only a small bump, as the absorption/emission spectrum of methane is rapidly varying with a large number of closely spaced sharp peaks in the 3-5 micrometer range. However, in other embodiments that provide a higher spectral resolution, the bump may be more clearly distinguishable and follow the methane absorption/emission spectrum more closely. Ethene is slightly heavier than methane and its spectrum therefore is not quite as rapidly varying. However, the peaks are still very sharp and closely spaced. Thus, a bump corresponding to the absorption/emission wavelengths for ethene is not significantly noticeable in the reconstructed spectrum 1020 for ethane in this example, but embodiments with a higher spectral resolution may produce more noticeable results. The reconstructed spectrum 1030 for butane is more accurate. The absorption/emission spectrum for butane is not as rapidly varying as that of the lighter hydrocarbons, therefore the reconstructed spectrum is more accurate. The same applies to the reconstructed spectra 1040 for carbon dioxide and the reconstructed spectra 1050 for nitrous oxide, both of which were accurate.

In FIG. 10, butane, carbon dioxide and nitrous oxide are clearly distinguishable from each other, and also distinguishable from the two lighter hydrocarbons, methane and ethene. Thus, this example embodiment of gas imaging system 800 may not only detect, but identify (e.g., distinguish) butane, carbon dioxide and nitrous oxide in real applications. The two lighter hydrocarbons, methane and ethene, may be detected, but a gas imaging system 800 configured to provide a higher spectral resolution according to some embodiments may be needed to identify them.

In this regard, according to some embodiments, the number of lenslets in the lenslet array 310, which determines the number of sub-images and corresponding number of sample points, is increased to provide a higher spectral resolution as discussed herein above. However, as also discussed, if the resolution of the FPA 330 is not increase accordingly, this decreases the spatial resolution. In some embodiments, either or both of the number of lenslets and the resolution of the FPA 330 are increased to provide a higher spectral resolution capable of identifying lighter hydrocarbons such as methane and ethene.

As also discussed herein above, a small increase in spectral resolution may be achieved in some embodiments by making the interferograms more single-sided, such as using a smaller number of negative sample points (e.g., less than 25% of the total sample points, such as in the range of 5-20%) or using no negative sample points (e.g., 0% of the total sample points) for phase correction.

In some embodiments, another way to increase the spectral resolution is to employ spatial heterodyning. In these embodiments, the gas imaging system further comprises a quarter-wave plate and a polarization grating (not shown in the figures). These components introduce a wavenumber dependence in the optical path difference, giving an offset in the interferogram, $$I(\Delta) = \int_0^\infty I(\tilde{v})(1+\cos(2\pi\Delta(\tilde{v}-\tilde{v}_0)))d\tilde{v}, \quad \text{(Equation 24)}$$

where $\tilde{v}_0$ is the offset, determined by the characteristics of the polarization grating. As already mentioned, the interferogram sampling points may be evenly spread out in wavenumber space between $\tilde{v}_{min}$ and $\tilde{v}_{max}=1/\lambda_{min}$, and samples between 0 cm$^{-1}$ to $\lambda_{min}$ may be wasted in other embodiments. However, by providing the offset $\tilde{v}_0$ in these embodiments, the minimum wavenumber can be shifted to minimize the number of samples outside the region of interest. In one example, by selecting $\tilde{v}_0=1/\lambda_{max}$, all samples would be within the region of interest. For example, instead of roughly 12 samples between 3-5 micrometers in the example illustrated with reference to Equation 22, all $N_{\lambda,tot}=30$ samples would be within this band.

Where applicable, one or more embodiments provided by the present disclosure may be implemented using hardware, software, or combinations of hardware and software. Also where applicable, the various hardware components and/or software components set forth herein can be combined into composite components comprising software, hardware, and/or both. Where applicable, the various hardware components and/or software components set forth herein can be separated into sub-components comprising software, hardware, or both. In addition, where applicable, it is contemplated that software components may be implemented as hardware components, and vice-versa. Where applicable, the ordering of various steps described herein can be changed, combined into composite steps, and/or separated into sub-steps to provide features described herein.

The foregoing disclosure is not intended to limit the scope of protection to the precise forms or particular fields of use disclosed. It is contemplated that various alternate embodiments and/or modifications, whether explicitly described or implied herein, are possible in light of the disclosure. Accordingly, the scope is defined only by the claims.

The invention claimed is:

1. A gas imaging system, comprising:
    a lenslet array configured to receive thermal radiation from a scene and transmit a plurality of substantially identical sub-images of the thermal radiation from the scene, wherein the thermal radiation comprises mid-wave infrared radiation and/or long-wave infrared radiation;
    a birefringent polarization interferometer (BPI) configured to receive the plurality of sub-images and generate an optical path difference for each ray of the plurality of sub-images based on a respective position of each ray entering the BPI, the optical path differences combining to form an interference fringe pattern, wherein at least a portion of the BPI is made of rutile, sapphire, or cadmium thiogallate; and
    an infrared focal plane array (FPA) configured to receive the plurality of sub-images modulated by the interference fringe pattern due to the optical path differences through the BPI to provide a thermal image.

2. The gas imaging system of claim 1, further comprising a logic device configured to determine a plurality of hyperspectral images each representing the thermal radiation from the scene in a different wavelength band based on the thermal image of the plurality of sub-images modulated by the interference fringe pattern, wherein the thermal image of the plurality of sub-images modulated by the interference fringe pattern represents a plurality of interferogram sample points of the thermal radiation from the scene, the number of the interferogram sample points being determined by the number of sub-images.

3. The gas imaging system of claim 2, wherein the logic device is configured to:
    determine the plurality of hyperspectral images at least by applying Fourier transforms respectively to groups of pixels from the thermal image, each group comprising pixels at the same relative position in the respective sub-images; and/or
    detect and/or identify a presence of one or more gases of interest by analyzing the hyperspectral images to compare against infrared absorption/emission spectra of the one or more gases; and
    generate a visual representation of the hyperspectral images for viewing by a user.

4. The gas imaging system of claim 1, wherein:
    the lenslet array and the BPI are positioned such that focal planes of lenslets comprised in the lenslet array coincide with a localization plane of the interference fringe pattern;
    the infrared FPA is positioned in the coinciding focal planes and the localization plane of the interference fringe pattern; and
    the gas imaging system further comprises a relay lens system disposed between the BPI and the infrared FPA and configured to relocate the coinciding focal planes and the localization plane of the interference fringe pattern.

5. The gas imaging system of claim 1, wherein the BPI comprises two prisms rotated 180 degrees in relation to each other.

6. The gas imaging system of claim 5, wherein:
    the two prisms are Nomarski prisms each comprising two uniaxial birefringent crystals wedged together with a wedge angle, and
    the BPI further comprises a generating polarizer before the two prisms, an analyzing polarizer after the two prisms, and a half-wave plate between the two prisms.

7. The gas imaging system of claim 5, wherein the two prisms are truncated to leave only a proportion of the two prisms below or above the symmetry axis of the two prisms, the proportion determined based on a proportion of interferogram sample points that are to be used for phase correction.

8. The gas imaging system of claim 5, wherein the two prisms are truncated in half such that the thermal image of the sub-images modulated by the interference fringe pattern corresponds to a single-sided interferogram sample points for the thermal radiation from the scene.

9. The gas imaging system of claim 5, wherein the two prisms are configured with a wedge angle and an optic axis inclination angle that provide a maximum value of the optical path differences that permits reconstruction of a minimum wavelength to be imaged by the gas imaging system.

10. The gas imaging system of claim 1, further comprising an afocal telescope configured to provide the thermal radiation to the lenslet array, wherein the afocal telescope comprises at least one objective lens and at least one baffle.

11. A method of using the gas imaging system of claim 1, the method comprising:
    receiving the thermal radiation emitted from the scene by the lenslet array;
    transmitting the plurality of substantially identical sub-images of the thermal radiation from the scene by the lenslet array;

receiving the plurality of substantially identical sub-images by the BPI;

generating the optical path difference for each ray of the plurality of substantially identical sub-images based on the respective position of each ray entering the BPI, the optical path differences combining to form the interference fringe pattern; and receiving, by the FPA, the plurality of substantially identical sub-images modulated by the interference fringe pattern due to the optical path differences through the BPI to provide the thermal image.

12. A method comprising:

receiving thermal radiation emitted from a scene by a lenslet array, wherein the thermal radiation comprises mid-wave infrared radiation and/or long-wave infrared radiation;

transmitting a plurality of substantially identical sub-images of the thermal radiation from the scene by the lenslet array;

receiving the plurality of sub-images by a birefringent polarization interferometer (BPI);

generating an optical path difference for each ray of the plurality of sub-images based on a respective position of each ray entering the BPI, the optical path differences combining to form an interference fringe pattern, wherein the BPI comprises two prisms rotated 180 degrees in relation to each other, and wherein the generating of the optical path difference for each ray of the plurality of sub-images comprises passing each ray through the two prisms that are truncated to leave only a proportion of the two prisms below or above the symmetry axis of the two prisms, the proportion determined based on a proportion of interferogram sample points that are to be used for phase correction; and receiving, by an infrared focal plane array (FPA), the plurality of sub-images modulated by the interference fringe pattern due to the optical path differences through the BPI to provide a thermal image.

13. The method of claim 12, wherein the thermal image of the plurality of sub-images modulated by the interference fringe pattern represents a plurality of interferogram sample points of the thermal radiation from the scene, the number of the interferogram sample points being determined by the number of sub-images.

14. The method of claim 12, further comprising:

determining a plurality of hyperspectral images each representing the thermal radiation from the scene in a different wavelength band based on the thermal image of the plurality of sub-images modulated by the interference fringe pattern, wherein the determining of the plurality of hyperspectral images comprises applying Fourier transforms respectively to groups of pixels from the thermal image, each group comprising pixels at the same relative position in the respective sub-images;

detecting and/or identifying a presence of one or more gases of interest by analyzing the hyperspectral images to compare against infrared absorption/emission spectra of the one or more gases; and generating a visual representation of the hyperspectral images for viewing by a user.

15. The method of claim 12, wherein:

focal planes of lenslets comprised in the lenslet array coincide with a localization plane of the interference fringe pattern;

the receiving by the FPA comprises receiving the plurality of sub-images modulated by the interference fringe pattern at the coinciding focal planes and the localization plane of the interference fringe pattern; and the method further comprises:

relaying the coinciding focal planes and the localization plane of the interference fringe pattern to the FPA.

16. The method of claim 12, wherein the two prisms are Nomarski prisms each comprising two uniaxial birefringent crystals wedged together with a wedge angle, and wherein the generating of the optical path difference for each ray of the plurality of sub-images comprises passing each ray through a generating polarizer before the two prisms, a half-wave plate between the two prisms, and an analyzing polarizer after the two prisms.

17. The method of claim 12, wherein the generating of the optical path difference for each ray of the plurality of sub-images comprises passing each ray through the two prisms that are truncated such that the thermal image of the sub-images modulated by the interference fringe pattern corresponds to a single-sided interferogram sample points for the thermal radiation from the scene.

18. The method of claim 12, wherein the generating of the optical path difference for each ray of the plurality of sub-images comprises passing each ray through the two prisms that are configured with a wedge angle and an optic axis inclination angle that provide a maximum value of the optical path differences that permits reconstruction of a minimum wavelength to be imaged by a gas imaging system.

19. A gas imaging system, comprising:

a lenslet array configured to receive thermal radiation from a scene and transmit a plurality of substantially identical sub-images of the thermal radiation from the scene, wherein the thermal radiation comprises mid-wave infrared radiation and/or long-wave infrared radiation;

a birefringent polarization interferometer (BPI) configured to receive the plurality of sub-images and generate an optical path difference for each ray of the plurality of sub-images based on a respective position of each ray entering the BPI, the optical path differences combining to form an interference fringe pattern;

an infrared focal plane array (FPA) configured to receive the plurality of sub-images modulated by the interference fringe pattern due to the optical path differences through the BPI to provide a thermal image; and a cold shield aperture between the BPI and the infrared FPA.

20. The gas imaging system of claim 19, wherein at least a portion of the BPI is made of rutile, sapphire, or cadmium thiogallate.

* * * * *